US012551466B1

(12) United States Patent
Umrethia et al.

(10) Patent No.: US 12,551,466 B1
(45) Date of Patent: Feb. 17, 2026

(54) READY-TO-USE ORAL LIQUID FORMULATION OF CLONIDINE

(71) Applicant: Liqmeds Worldwide Limited, Weedon (GB)

(72) Inventors: Manish Umrethia, Ahmedabad (IN); Ronak Patel, Ahmedabad (IN)

(73) Assignee: LIQMEDS WORLDWIDE LIMITED, Weedon (GB)

( * ) Notice: Subject to any disclaimer, the term of this patent is extended or adjusted under 35 U.S.C. 154(b) by 0 days.

(21) Appl. No.: 19/307,340

(22) Filed: Aug. 22, 2025

(30) Foreign Application Priority Data

Jun. 10, 2025 (IN) .............................. 202521056409

(51) Int. Cl.
| | |
|---|---|
| *A61K 31/4168* | (2006.01) |
| *A61K 9/00* | (2006.01) |
| *A61K 9/08* | (2006.01) |
| *A61K 47/02* | (2006.01) |
| *A61K 47/10* | (2017.01) |
| *A61K 47/12* | (2006.01) |
| *A61K 47/14* | (2017.01) |

(52) U.S. Cl.
CPC ........ *A61K 31/4168* (2013.01); *A61K 9/0053* (2013.01); *A61K 9/08* (2013.01); *A61K 47/02* (2013.01); *A61K 47/10* (2013.01); *A61K 47/12* (2013.01); *A61K 47/14* (2013.01)

(58) Field of Classification Search
CPC .... A61K 31/4168; A61K 9/0053; A61K 9/08; A61K 47/02; A61K 47/10; A61K 47/12; A61K 47/14
USPC ........................................................ 514/401
See application file for complete search history.

(56) References Cited

U.S. PATENT DOCUMENTS

| | | |
|---|---|---|
| 11,207,297 B2 | 12/2021 | Patel et al. |
| 12,233,049 B2 | 2/2025 | Mandge et al. |
| 2025/0064731 A1 | 2/2025 | Barot |

FOREIGN PATENT DOCUMENTS

EP 4122450 A1 1/2023

OTHER PUBLICATIONS

Catapres® (Clonidine Hydrochloride) Tablets, for Oral Use, US Prescribing Information, Boehringer Ingelheim (2012), 9 pp.
Onyda XR® (Clonidine Hydrochloride) Suspension, Extended Release, for Oral Use, US Prescribing Information, Tris Pharma Inc. (2025), 33 pp.
Clonidine Hydrochloride (50 mcg/5 mL) Oral Solution, UK Prescribing Information, Syri Limited (2023), 11 pp.
Clonidine Hydrochloride (50 mcg/5 mL) Oral Solution, UK Prescribing Information, Roma Pharmaceuticals Ltd. (2024), 9 pp.
Clonidine Hydrochloride (50 mcg/5 mL) Oral Solution, UK Prescribing Information, Milpharm Limited (Mar. 2025), 11 pp.
Merino-Bohorquez et al., "Physicochemical and microbiological stability of two new oral liquid formulations of clonidine hydrochloride for pediatric patients". Pharmaceutical Development and Technology (2019), 24(4), 15 pp.
Levinson ML, and Johnson CE., "Stability of an extemporaneously compounded clonidine hydrochloride oral liquid". American Society of Hospital Pharmacists (1992), 49(1), 4 pp.

*Primary Examiner* — Yevgeny Valenrod
(74) *Attorney, Agent, or Firm* — Merchant & Gould P.C.; Daniel R. Evans

(57) ABSTRACT

The present disclosure relates generally to a ready-to-use oral liquid formulation of clonidine or pharmaceutically acceptable salt thereof, as well as methods of manufacture and use.

23 Claims, No Drawings

READY-TO-USE ORAL LIQUID FORMULATION OF CLONIDINE

RELATED APPLICATION

This application claims priority to Indian Patent Application number 202521056409, filed on Jun. 10, 2025, the subject matter of which is incorporated by reference.

FIELD

The present disclosure relates generally to a ready-to-use oral liquid formulation of clonidine or pharmaceutically acceptable salt thereof, as well as methods of manufacture and use.

BACKGROUND

Clonidine hydrochloride is an antihypertensive agent. It stimulates alpha-adrenoreceptors in the brain stem and results in reduced sympathetic outflow from the central nervous system and in decreases in peripheral resistance, renal vascular resistance, heart rate, and blood pressure.

CATAPRES® (clonidine hydrochloride) tablets for oral use, are indicated in the treatment of hypertension. It may be use alone or concomitantly with other antihypertensive agents.

Clonidine hydrochloride is an imidazoline derivative and exists as a mesomeric compound. The chemical name is 2-(2,6-dichlorophenylamino)-2-imidazoline hydrochloride. Clonidine hydrochloride is an odorless, bitter, white, crystalline substance soluble in water and alcohol. Clonidine hydrochloride has the following chemical structure:

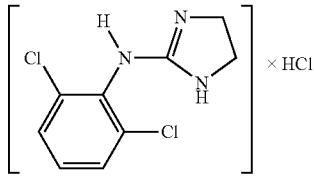

CATAPRES® tablets are available in three dosage strengths: 0.1 mg, 0.2 mg, and 0.3 mg. The 0.1 mg tablet is equivalent to 0.087 mg of the free base. CATAPRES® tablets contains inactive ingredients colloidal silicon dioxide, corn starch, dibasic calcium phosphate, FD&C Yellow No. 6, gelatin, glycerin, lactose, and magnesium stearate. The CATAPRES® 0.1 mg tablet also contains FD&C Blue No. 1 and FD&C Red No. 3.

Syri discloses a liquid formulation of clonidine hydrochloride (50 micrograms/5 mL or 0.01 mg/mL) which has been approved in the UK with inactive ingredients, including methyl parahydroxybenzoate, sodium dihydrogen phosphate monohydrate, disodium hydrogen phosphate anhydrous, sucralose, and purified water. Syri, Sect. 6.1. Syri's liquid formulation contains 1.8 mg/mL of methyl parahydroxybenzoate. Syri, Sect. 2. Except for methyl parahydroxybenzoate, Syri does not disclose the amounts of the inactive ingredients, including the amount of buffer components (sodium dihydrogen phosphate monohydrate and disodium hydrogen phosphate anhydrous), and further, there is no mention of the pH of the liquid formulation. Syri's liquid formulation is approved for use for the prophylactic management of migraine or recurrent vascular headache, and the management of vasomotor conditions commonly associated with the menopause and characterised by flushing. Syri, Sect. 4.1.

Roma discloses a liquid formulation of clonidine hydrochloride (50 micrograms/5 mL or 0.01 mg/mL) which has been approved in the UK with inactive ingredients, including benzoic acid, glycerol, xylitol, peppermint flavour, orthophosphoric acid, and purified water. Roma, Sect. 6.1. Roma's liquid formulation contains 0.6 mg/mL of benzoic acid. Roma, Sect. 2. Except for benzoic acid, Roma does not disclose the amounts of the inactive ingredients, including the amount of orthophosphoric acid, and further, there is no mention of the pH of the liquid formulation. Roma's liquid formulation is approved for use for the prophylactic management of migraine or recurrent vascular headache, and the management of vasomotor conditions commonly associated with the menopause and characterised by flushing. Roma, Sect. 4.1.

Milpharm discloses a liquid formulation of clonidine hydrochloride (50 micrograms/5 mL or 0.01 mg/mL) which has been approved in the UK with inactive ingredients, including methyl parahydroxybenzoate, sucralose, and purified water. Milpharm, Sect. 6.1. Milpharm's liquid formulation contains 1.8 mg/mL of methyl parahydroxybenzoate. Milpharm, Sect. 2. Except for methyl parahydroxybenzoate, Milpharm does not disclose the amounts of the inactive ingredients. Milpharm's liquid formulation is free from any buffering agent (example, sodium dihydrogen phosphate and disodium hydrogen phosphate), and further, there is no mention of the pH of the liquid formulation. Milpharm's liquid formulation is approved for use for the prophylactic management of migraine or recurrent vascular headache, and the management of vasomotor conditions commonly associated with the menopause and characterised by flushing. Milpharm, Sect. 4.1.

Tris Pharma discloses an extended-release suspension for oral administration. Each mL contains 0.09 mg clonidine equivalent to 0.1 mg clonidine hydrochloride (0.095 mg clonidine hydrochloride complexed with sodium polystyrene sulfonate and 0.005 mg clonidine hydrochloride). The pH is between 2.8 and 4. The inactive ingredients are anhydrous citric acid, edetate disodium, glycerin, modified starch, methylparaben, orange flavor, polyvinyl acetate dispersion 30%, povidone, polysorbate 80, propylparaben, purified water, sucrose, sodium polystyrene sulfonate, triacetin, and xanthan gum. Tris Pharma, Sect. 11.

Patel claims a liquid pharmaceutical solution suitable for oral administration, consisting of: clonidine or pharmaceutically acceptable salts thereof present in the amount of 0.001% w/v, at least one buffer having a buffer strength in the range from 5 to 150 millimolar, at least one sweetener, and at least one preservative in purified water, wherein the solution has a pH in the range from 5 to 6. Patel, claim 1. Patel's claimed liquid pharmaceutical solution is reportedly suitable for oral administration, but given the bitter taste associated with clonidine, the absence of a flavoring agent suggests that Patel's claimed liquid pharmaceutical solution is unsuitable for oral administration. Patel showed some impurities level (i.e. single max unknown impurity and total impurities) even at 3 months storage at 25° C. and 40° C. Patel, Example 4.

Mandge claims a liquid pharmaceutical composition consisting of: (a) clonidine hydrochloride at a concentration of about 20 g/mL; (b) sodium chloride as a stabilizer at a concentration of about 2.5 mg/mL; (c) a preservative at a concentration of about 0.01% to 5.0%; (d) a sweetener at a concentration of about 0.20 mg/mL; (e) a flavoring agent at a concentration of about 0.20 mg/mL; and (f) water; and (g) optionally, a pH adjusting agent; wherein said composition is free of buffer, contained in a multi-dose container, and an oral solution; wherein not more than 2% w/w of total impurities are formed when said composition is stored for at least 6 months at 25° C./40% RH or 25° C./60% RH or 40° C./25% RH or 40° C./75% RH. Mandge, claim 1. Mandge's clonidine liquid composition is buffer-free and paraben-free and includes sodium chloride as a stabilizer. Mandge disclosed that the stabilizer used therein inhibits, prevents, slows down, or reduces the degradation of clonidine. Mandge, 9:28-29. Based on examples, Mandge's target pH range is below pH 6.

Barot claims a liquid pharmaceutical formulation of clonidine hydrochloride comprising clonidine hydrochloride, preservative, sweetener and a vehicle, wherein the formulation is free of buffer. Barot, claim 1.

Carr relates generally to a liquid pharmaceutical composition in the form of an oral liquid solution for oral administration comprising clonidine or a pharmaceutically acceptable salt thereof, at least one carrier agent to dissolve or substantially dissolve the clonidine or the pharmaceutically acceptable salt of clonidine therein, and wherein the pharmaceutical composition does not contain a buffer. Carr, claim 1. Carr discloses that the pH of the formulation is not adjusted but is normally approximate pH 5.

The information cited herein discloses generally that a clonidine hydrochloride composition free of a buffer possesses a long-term stability by use of stabiliser (e.g., sodium chloride).

Disclosed herein is a ready-to-use oral liquid formulation comprising clonidine or pharmaceutically acceptable salt thereof, a buffer, and propylene glycol having a long-term stability.

Objectives

An objective of this disclosure relates generally to a ready-to-use oral liquid formulation of clonidine or pharmaceutically acceptable salt thereof, as well as methods of manufacture and use.

Yet another objective of the present invention is to provide stable ready-to-use oral liquid formulation of clonidine or pharmaceutically acceptable salt thereof.

SUMMARY

Disclosed herein is a ready-to-use oral liquid formulation comprising clonidine or pharmaceutically acceptable salt thereof.

The main aspect relates to a ready-to-use oral liquid formulation, comprising: clonidine or pharmaceutically acceptable salt thereof; propylene glycol; one or more buffering agents; one or more pharmaceutically acceptable excipients; and purified water.

Yet another aspect disclosed herein relates to a process for preparing a ready-to-use oral liquid formulation comprising clonidine or pharmaceutically acceptable salt thereof.

DETAILED DESCRIPTION

It is to be understood that ready-to-use (RTU) formulations disclosed herein are not limited to any particular exemplified formulation, example, or process parameter. It is also to be understood that the terminology used herein is for the purpose of describing embodiments and is not intended to be limiting.

As used herein, the singular forms "a," "an," and "the" include plural referents unless the content clearly dictates otherwise.

Unless defined otherwise, all technical and scientific terms used herein have the same meaning as commonly understood in this field. For instance, the expression "about" has its customary meaning, as defined in the USP, Section 8.20, which states that "about" indicates a quantity within 10%. One will appreciate that all physicochemical quantities/parameters reported herein may be associated with a certain variation even though a given numerical value of said quantity/parameter is not preceded by the qualifier "amount."

As used herein the expression "% w/w," refers to the percent weight of an identified component based on the total weight of the liquid oral solution formulation.

As used herein the expression "% v/v," refers to the percent volume of an identified component based on the total volume of the liquid oral solution formulation.

As used herein the expression "quantity sufficient" or "q. s.," refers to the amount of a substance required to meet a certain parameter, for instance as a makeup volume of vehicle required to provide a solution of a given volume.

As used herein the word "RTU" refers to ready-to-use as it is ready to be administered directly to a patient for a treatment, without an additional step, such as reconstitution or dilution and it can interchangeably use for "ready-to-use" phrase.

As used herein the expression "liquid formulation" refers to liquid oral formulation in the form of solution.

As used herein the word, "solution" as mentioned herein is defined as the liquid dosage form that has no suspended particles.

As used herein, the word "comprise(s)" or "comprising" have their customary meaning. When used in the context of a process, the word "comprising" means that the process includes at least the recited steps, but may include additional steps. When used in the context of a formulation, the word "comprising" means that the formulation includes at least the recited features or components, but may also include additional features or components.

One will understand that the word "consisting of" may replace the word "comprising" for a claimed formulation, process, or method.

One will further understand that the word "consisting essentially of" may replace the word "comprising" for a claimed formulation, process or method.

A first embodiment relates to a ready-to-use oral liquid formulation, comprising: clonidine or pharmaceutically acceptable salt thereof; propylene glycol; one or more buffering agents; one or more pharmaceutically acceptable excipients; and purified water.

In one aspect, the formulation does not include a stabilizer (e.g., an amino acid (such as glycine, alanine, glutamate, sodium glutamate, arginine, lysine, cysteine, methionine), an inorganic salt (e.g., sodium chloride, potassium chloride, calcium chloride, magnesium chloride), ethylenediaminetetraacetic acid (EDTA), a metal ion (e.g., zinc, magnesium, calcium), a cyclodextrin, a sugar (e.g., sucrose, mannitol, trehalose), a sugar alcohol (e.g., erythritol, threitol, arabitol, xylitol, ribitol, mannitol, sorbitol, dulcitol, iditol, isomalt, maltitol, lactitol, polyglycitol), a monosaccharide (e.g., glucose, galactose, fructose, mannose), a disaccharide (e.g., sucrose, maltose, lactose), a polysaccharide (e.g. an oligosaccharide, starch, cellulose), a pH adjusting agent (e.g., acetic acid, an ammonia solution, glacial acetic acid, anhydrous ammonium carbonate, diethanolamine, potassium hydroxide, fumaric acid, sodium bicarbonate, hydrochloric acid, sodium borate, sodium carbonate, malic acid, trolamine, phosphoric acid, sodium hydroxide, nitric acid, diluted phosphoric acid, propionic acid, sulfuric acid), a preservative (such as potassium sorbate, sorbic acid, sodium propionate), a carrier agent (e.g., ethanol, acetone, alcohol, benzyl alcohol, benzyl benzoate, butylene glycol, dibutyl phthalate, diethyl phthalate, dimethyl phthalate, dimethyl sulfoxide, dimethylacetamide, glycofurol, glycerin, isopropyl alcohol, isopropyl myristate, isopropyl palmitate, polyethylene glycol, propylene carbonate, pyrrolidone, triacetin, triethyl citrate, triolein, glycerol, sorbitol, liquid mannitol).

One aspect relates to a ready-to-use oral liquid formulation, comprising: clonidine or pharmaceutically acceptable salt thereof; propylene glycol; one or more buffering agents; one or more pharmaceutically acceptable excipients; and purified water; wherein the one or more pharmaceutically acceptable excipients does not include a substantial amount of any one of the stabilizer.

Alternatively, one aspect relates to a ready-to-use oral liquid formulation, comprising: clonidine or pharmaceutically acceptable salt thereof; propylene glycol; one or more buffering agents; one or more pharmaceutically acceptable excipients; and purified water; wherein the one or more pharmaceutically acceptable excipients does not include any one of sodium chloride, potassium sorbate, sorbic acid, and sodium propionate.

The ready-to-use oral liquid formulation disclosed herein includes a "pharmaceutically acceptable salt" of clonidine. Examples of suitable pharmaceutically acceptable salts include, for example, hydrochloride, hydrobromide, sulphate, phosphate, acetate, maleate, fumarate, lactate, tartrate, citrate, sodium, potassium, calcium and the like. For instance, a particular clonidine pharmaceutically acceptable salt contemplated herein is clonidine hydrochloride.

In one aspect, the amount of clonidine hydrochloride in the ready-to-use oral liquid formulation may range from 0.01 mg/mL to 20 mg/mL and all values in between, such as for example, 0.02 mg/mL, 0.03 mg/mL, 0.04 mg/mL, 0.05 mg/mL, 0.06 mg/mL, 0.07 mg/mL, 0.08 mg/mL, 0.09 mg/mL, 0.1 mg/mL, 0.2 mg/mL, 0.3 mg/mL, 0.4 mg/mL, 0.5 mg/mL, 0.6 mg/mL, 0.7 mg/mL, 0.8 mg/mL, 0.9 mg/mL, 1 mg/mL, 2 mg/mL, 3 mg/mL, 4 mg/mL, 5 mg/mL, 6 mg/mL, 7 mg/mL, 8 mg/mL, 9 mg/mL, 10 mg/mL, 12 mg/mL, 14 mg/mL, 16 mg/mL, and 18 mg/mL. In other words, the amount of clonidine hydrochloride in the ready-to-use oral liquid formulation may range from 0.001% w/w to 2% w/w and all values in between, such as for example, 0.002% w/w, 0.003% w/w, 0.004% w/w, 0.005% w/w, 0.006% w/w, 0.007% w/w, 0.008% w/w, 0.009% w/w, 0.010% w/w, 0.020% w/w, 0.030% w/w, 0.040% w/w, 0.050% w/w, 0.060% w/w, 0.070% w/w, 0.080% w/w, 0.090% w/w, 0.1% w/w, 0.2% w/w, 0.3% w/w, 0.4% w/w, 0.5% w/w, 0.6% w/w, 0.7% w/w, 0.8% w/w, 0.9% w/w, 1% w/w, 1.2% w/w, 1.4% w/w, 1.6% w/w, and 1.8% w/w.

One aspect relates to a ready-to-use oral liquid formulation, comprising: clonidine or pharmaceutically acceptable salt thereof in an amount of about 0.05 mg/mL; propylene glycol; one or more buffering agents; one or more pharmaceutically acceptable excipients; and purified water.

One aspect relates to a ready-to-use oral liquid formulation, comprising: clonidine or pharmaceutically acceptable salt thereof in an amount of about 0.05 mg/mL; propylene glycol in an amount of from about 50 mg/mL to about 300 mg/mL; one or more buffering agents; one or more pharmaceutically acceptable excipients; and purified water.

The ready-to-use oral liquid formulation disclosed herein includes an amount of a "buffer," which may function by maintaining the pH of the liquid medium. Examples of suitable buffers include, for example, one or more of citrate, sulfamate, acetate, aconitate, formate, glutarate, succinate, glutamate, malate, tartrate, carbonate, tris(hydroxymethyl) aminomethane (or "tris"), borate, glycinate, phosphate, and the like. A specifically contemplated buffer is comprised of phosphoric acid, monobasic sodium phosphate, and dibasic sodium phosphate, in which the mono-, or di-phosphate forms have associated counterions and thus, may collectively be referred to as phosphate salts (viz., phosphate buffer). The associated counterions include, for example, sodium, potassium, ammonium, hydrogen, etc. For instance, a particular phosphate salt contemplated herein is sodium dihydrogen phosphate, and disodium hydrogen phosphate, which may exist as a hydrated form, such as, a dihydrate or a pentahydrate. One will understand that the molar amounts of sodium dihydrogen phosphate, and disodium hydrogen phosphate, relative to each other, will depend on the pH of the composition. Therefore, one will appreciate that the amount of phosphate (i.e., sodium dihydrogen phosphate, and disodium hydrogen phosphate) in the liquid formulation refers to the amount added during manufacture. As stated herein, the buffer serves to maintain the pH about 6 to about 8 and all values in between, including 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, and 7.9. Thus, the pH of the ready-to-use oral liquid formulation may range from about 6 to about 8 (or from 6 to 8).

The amount of buffer may range from 1 mg/mL to 50 mg/mL, and all values in between, such as for example, 2 mg/mL, 3 mg/mL, 4 mg/mL, 5 mg/mL, 6 mg/mL, 7 mg/mL, 8 mg/mL, 9 mg/mL, 10 mg/mL, 11 mg/mL, 12 mg/mL, 13 mg/mL, 14 mg/mL, 15 mg/mL, 16 mg/mL, 17 mg/mL, 18 mg/mL, 19 mg/mL, 20 mg/mL, 21 mg/mL, 22 mg/mL, 23 mg/mL, 24 mg/mL, 25 mg/mL, 26 mg/mL, 27 mg/mL, 28 mg/mL, 29 mg/mL, 30 mg/mL, 35 mg/mL, 40 mg/mL, and 45 mg/mL. In other words, the amount of buffer in the ready-to-use oral liquid formulation may range from 0.1% w/w to 5% w/w and all values in between, such as for example, 0.2% w/w, 0.3% w/w, 0.4% w/w, 0.43% w/w, 0.5% w/w, 0.6% w/w, 0.7% w/w, 0.8% w/w, 0.83% w/w, 0.9% w/w, 1% w/w, 1.1% w/w, 1.2% w/w, 1.3% w/w, 1.4% w/w, 1.5% w/w, 1.6% w/w, 1.7% w/w, 1.8% w/w, 1.9% w/w, 2% w/w, 2.1% w/w, 2.2% w/w, 2.3% w/w, 2.4% w/w, 2.5% w/w, 2.6% w/w, 2.7% w/w, 2.8% w/w, 2.9% w/w, 3% w/w, 3.5% w/w, 4% w/w, and 4.5% w/w.

One may appreciate that an amount of buffer may be expressed in terms of milli-molar ("mM" or mmol per liter), which relates to the mmol total of buffer components (in the medium) divided by the volume of the medium in liters. In that regard, the amount of buffer may range from about 0.1 mM to about 500 mM and all values in between, including, for example, about 0.2 mM, 0.3 mM, 0.4 mM, 0.5 mM, 0.6 mM, 0.7 mM, 0.8 mM, 0.9 mM, 1 mM, 2 mM, 3 mM, 4 mM, 5 mM, 6 mM, 7 mM, 8 mM, 9 mM, 10 mM, 15 mM, 20 mM, 25 mM, 30 mM, 35 mM, 40 mM, 45 mM, 50 mM, 55 mM, 60 mM, 65 mM, 70 mM, 75 mM, 80 mM, 85 mM, 90 mM, 95 mM, 100 mM, 110 mM, 120 mM, 130 mM, 140 mM, 150 mM, 160 mM, 170 mM, 180 mM, 190 mM, 200 mM, 220 mM, 240 mM, 260 mM, 280 mM, 300 mM, 350 mM, 400 mM, and 450 mM.

Accordingly, another aspect relates to a ready-to-use oral liquid formulation, comprising: clonidine or pharmaceutically acceptable salt thereof in an amount of about 0.05 mg/mL; propylene glycol in an amount of from about 50 mg/mL to about 300 mg/mL; one or more buffering agents in an amount of from about 2 mg/mL to about 10 mg/mL; one or more pharmaceutically acceptable excipients; and purified water.

Another aspect relates to a ready-to-use oral liquid formulation, comprising: clonidine or pharmaceutically acceptable salt thereof in an amount of about 0.05 mg/mL; propylene glycol in an amount of from about 50 mg/mL to about 300 mg/mL; one or more buffering agents in an amount of from about 2 mg/mL to about 10 mg/mL to provide a formulation pH of from about 6 to about 8; one or more pharmaceutically acceptable excipients; and purified water.

In one aspect, the weight ratio of sodium dihydrogen phosphate to disodium hydrogen phosphate in the oral liquid formulation disclosed herein is about 1:0.5 to about 1:2 and all values in between, including, for example, 1:0.6, 1:0.7, 1.075, 1:0.8, 1:0.9, 1:1, 1:1.1, 1:1.2, 1:1.3, 1:1.4, 1:1.5, 1:1.6, 1:1.7, 1:1.8, and 1:1.9.

Another aspect relates to a ready-to-use oral liquid formulation disclosed herein comprising an amount of one or more pharmaceutically acceptable excipients, including, for example, a sweetener, a preservative, a flavour, or a combination thereof.

Another aspect relates to a ready-to-use oral liquid formulation disclosed herein comprising an amount of one or more pharmaceutically acceptable excipients, including, for example, a sweetener, a preservative, a flavour, or a combination thereof in an amount of from about 0.01 mg/mL to about 10 mg/mL and all values in between, such as for example, 0.02 mg/mL, 0.03 mg/mL, 0.04 mg/mL, 0.05 mg/mL, 0.06 mg/mL, 0.07 mg/mL, 0.08 mg/mL, 0.09 mg/mL, 0.10 mg/mL, 0.20 mg/mL, 0.30 mg/mL, 0.40 mg/mL, 0.50 mg/mL, 0.60 mg/mL, 0.70 mg/mL, 0.80 mg/mL, 0.90 mg/mL, 1 mg/mL, 1.2 mg/mL, 1.4 mg/mL, 1.6 mg/mL, 1.8 mg/mL, 2 mg/mL, 3 mg/mL, 4 mg/mL, 5 mg/mL, 6 mg/mL, 7 mg/mL, 8 mg/mL, and 9 mg/mL. In other words, one or more pharmaceutically acceptable excipients, including, for example, a sweetener, a preservative, a flavour, or a combination thereof in an amount of from 0.001% w/w to 1% w/w and all values in between, such as for example, 0.002% w/w, 0.003% w/w, 0.004% w/w, 0.005% w/w, 0.006% w/w, 0.007% w/w, 0.008% w/w, 0.009% w/w, 0.01% w/w, 0.02% w/w, 0.03% w/w, 0.04% w/w, 0.05% w/w, 0.06% w/w, 0.07% w/w, 0.08% w/w, 0.09% w/w, 0.1% w/w, 0.2% w/w, 0.3% w/w, 0.4% w/w, 0.5% w/w, 0.6% w/w, 0.7% w/w, 0.8% w/w, and 0.9% w/w.

Another aspect relates to a ready-to-use oral liquid formulation, comprising: clonidine or pharmaceutically acceptable salt thereof in an amount of about 0.05 mg/ml; propylene glycol; one or more buffering agents to provide a formulation pH of from about 6 to about 8; one or more pharmaceutically acceptable excipients comprising a sweetener, a preservative, a flavour, or a combination thereof; and purified water.

Another aspect relates to a ready-to-use oral liquid formulation, comprising: clonidine or pharmaceutically acceptable salt thereof in an amount of about 0.05 mg/mL; propylene glycol in an amount of from about 50 mg/mL to about 300 mg/mL; one or more buffering agents in an amount of from about 2 mg/mL to about 10 mg/mL to provide a formulation pH of from about 6 to about 8; one or more pharmaceutically acceptable excipients comprising a sweetener, a preservative, a flavour, or a combination thereof; and purified water.

Another aspect relates to a ready-to-use oral liquid formulation, comprising: clonidine or pharmaceutically acceptable salt thereof in an amount of about 0.05 mg/ml; propylene glycol in an amount of about 100 mg/mL; one or more buffering agents in an amount of from about 2 mg/mL to about 10 mg/mL to provide a formulation pH of from about 6 to about 8; one or more pharmaceutically acceptable excipients comprising a sweetener, a preservative, a flavour, or a combination thereof; and purified water.

Examples of sweeteners include but are not limited to acesulfame or its potassium salt thereof, alitame, ammonium glycyrrhizinate, aspartame, cyclamate or its corresponding sodium or calcium salt, dulcin, neohesperidin dihydrochalcone, neotame, saccharin or its corresponding sodium, potassium or calcium salt, a steviol glycoside, thaumatin, sucralose, or any combination thereof.

The amount a sweetener may range from 0.01 mg/mL to 10 mg/mL and all values in between, including, for example, 0.02 mg/mL, 0.03 mg/mL, 0.04 mg/mL, 0.05 mg/mL, 0.06 mg/mL, 0.07 mg/mL, 0.08 mg/mL, 0.09 mg/mL, 0.1 mg/mL, 0.11 mg/mL, 0.12 mg/mL, 0.13 mg/mL, 0.14 mg/mL, 0.15 mg/mL, 0.16 mg/mL, 0.17 mg/mL, 0.18 mg/mL, 0.19 mg/mL, 0.2 mg/mL, 0.3 mg/mL, 0.4 mg/mL, 0.5 mg/mL, 0.6 mg/mL, 0.7 mg/mL, 0.8 mg/mL, 0.9 mg/mL, 1 mg/mL, 1.1 mg/mL, 1.2 mg/mL, 1.3 mg/mL, 1.4 mg/mL, 1.5 mg/mL, 1.6 mg/mL, 1.7 mg/mL, 1.8 mg/mL, 1.9 mg/mL, 2 mg/mL, 3 mg/mL, 4 mg/mL, 5 mg/mL, 6 mg/mL, 7 mg/mL, 8 mg/mL, and 9 mg/mL. In other words, the amount of sweetener in the ready-to-use oral liquid formulation may range from 0.001% w/w to 1% w/w and all values in between, such as for example, 0.002% w/w, 0.003% w/w, 0.004% w/w, 0.005% w/w, 0.006% w/w, 0.007% w/w, 0.008% w/w, 0.009% w/w, 0.010% w/w, 0.011% w/w, 0.012% w/w, 0.013% w/w, 0.014% w/w, 0.015% w/w, 0.016% w/w, 0.017% w/w, 0.018% w/w, 0.019% w/w, 0.02% w/w, 0.03% w/w, 0.04% w/w, 0.05% w/w, 0.06% w/w, 0.07% w/w, 0.08% w/w, 0.09% w/w, 0.1% w/w, 0.2% w/w, 0.3% w/w, 0.4% w/w, 0.5% w/w, 0.6% w/w, 0.7% w/w, 0.8% w/w, and 0.9% w/w.

Another aspect relates to a ready-to-use oral liquid formulation, comprising: clonidine or pharmaceutically acceptable salt thereof in an amount of about 0.05 mg/ml; propylene glycol; one or more buffering agents to provide a formulation pH of from about 6 to about 8; one or more pharmaceutically acceptable excipients comprising a sweetener in an amount of from about 0.01 mg/mL to about 10 mg/mL; and purified water.

Examples of preservatives include but are not limited to phenoxyethanol, potassium benzoate, benzyl alcohol, benzoic acid, benzalkonium chloride, benzethonium chloride, cetrimonium bromide, cetylpyridinium chloride, bronopol, chlorbutol, chlorocresol, cresol, butyl paraben, methyl paraben, propyl paraben, ethyl paraben, phenol, thymol, phenyl ethanol, sodium benzoate, or any combination thereof.

The amount of preservative may range from 0.01 mg/mL to 10 mg/mL and all values in between, including, for example, 0.02 mg/mL, 0.03 mg/mL, 0.04 mg/mL, 0.05 mg/mL, 0.06 mg/mL, 0.07 mg/mL, 0.08 mg/mL, 0.09 mg/mL, 0.1 mg/mL, 0.11 mg/mL, 0.12 mg/mL, 0.13 mg/mL, 0.14 mg/mL, 0.15 mg/mL, 0.16 mg/mL, 0.17 mg/mL, 0.18 mg/mL, 0.19 mg/mL, 0.2 mg/mL, 0.3 mg/mL, 0.4 mg/mL, 0.5 mg/mL, 0.6 mg/mL, 0.7 mg/mL, 0.8 mg/mL, 0.9 mg/mL, 1 mg/mL, 1.1 mg/mL, 1.2 mg/mL, 1.3 mg/mL, 1.4 mg/mL, 1.5 mg/mL, 1.6 mg/mL, 1.7 mg/mL, 1.8 mg/mL, 1.9 mg/mL, 2 mg/mL, 3 mg/mL, 4 mg/mL, 5 mg/mL, 6 mg/mL, 7 mg/mL, 8 mg/mL, and 9 mg/mL. In other words, the amount of preservative in the ready-to-use oral liquid formulation may range from 0.001% w/w to 1% w/w and all values in between, such as for example, 0.002% w/w, 0.003% w/w, 0.004% w/w, 0.005% w/w, 0.006% w/w, 0.007% w/w, 0.008% w/w, 0.009% w/w, 0.010% w/w, 0.011% w/w, 0.012% w/w, 0.013% w/w, 0.014% w/w, 0.015% w/w, 0.016% w/w, 0.017% w/w, 0.018% w/w, 0.019% w/w, 0.02% w/w, 0.03% w/w, 0.04% w/w, 0.05% w/w, 0.06% w/w, 0.07% w/w, 0.08% w/w, 0.09% w/w, 0.1% w/w, 0.2% w/w, 0.3% w/w, 0.4% w/w, 0.5% w/w, 0.6% w/w, 0.7% w/w, 0.8% w/w, and 0.9% w/w.

Another aspect relates to a ready-to-use oral liquid formulation, comprising: clonidine or pharmaceutically acceptable salt thereof in an amount of about 0.05 mg/ml; propylene glycol; one or more buffering agents to provide a formulation pH of from about 6 to about 8; one or more pharmaceutically acceptable excipients comprising a preservative in an amount of from about 0.01 mg/mL to about 10 mg/mL; and purified water.

Examples of flavours include but are not limited to cinnamon oil, oil of wintergreen, peppermint oils, clove oil, bay oil, anise oil, *eucalyptus*, thyme oil, cedar leaf oil, oil of nutmeg, oil of sage, oil of bitter almonds, and *cassia* oil and the like or any combinations thereof. Also useful as flavours are vanilla, citrus oil, including lemon, orange, grape, lime, mint and grapefruit, and fruit essences, including apple, banana, pear, peach, strawberry, raspberry, cherry, plum, pineapple, apricot, tutti-frutti, and so forth and the like or any combination thereof. Solid forms, such as spray dried forms of flavours, may also be useful in the liquid compositions disclosed herein.

The amount of flavour may range from 0.01 mg/mL to 10 mg/mL and all values in between, including, for example, 0.02 mg/mL, 0.03 mg/mL, 0.04 mg/mL, 0.05 mg/mL, 0.06 mg/mL, 0.07 mg/mL, 0.08 mg/mL, 0.09 mg/mL, 0.1 mg/mL, 0.11 mg/mL, 0.12 mg/mL, 0.13 mg/mL, 0.14 mg/mL, 0.15 mg/mL, 0.16 mg/mL, 0.17 mg/mL, 0.18 mg/mL, 0.19 mg/mL, 0.2 mg/mL, 0.3 mg/mL, 0.4 mg/mL, 0.5 mg/mL, 0.6 mg/mL, 0.7 mg/mL, 0.8 mg/mL, 0.9 mg/mL, 1 mg/mL, 1.1 mg/mL, 1.2 mg/mL, 1.3 mg/mL, 1.4 mg/mL, 1.5 mg/mL, 1.6 mg/mL, 1.7 mg/mL, 1.8 mg/mL, 1.9 mg/mL, 2 mg/mL, 3 mg/mL, 4 mg/mL, 5 mg/mL, 6 mg/mL, 7 mg/mL, 8 mg/mL, and 9 mg/mL. In other words, the amount of flavour in the ready-to-use oral liquid formulation may range from 0.001% w/w to 1% w/w and all values in between, such as for example, 0.002% w/w, 0.003% w/w, 0.004% w/w, 0.005% w/w, 0.006% w/w, 0.007% w/w, 0.008% w/w, 0.009% w/w, 0.01% w/w, 0.011% w/w, 0.012% w/w, 0.013% w/w, 0.014% w/w, 0.015% w/w, 0.016% w/w, 0.017% w/w, 0.018% w/w, 0.019% w/w, 0.02% w/w, 0.03% w/w, 0.040% w/w, 0.050% w/w, 0.060% w/w, 0.070% w/w, 0.080% w/w, 0.090% w/w, 0.1% w/w, 0.2% w/w, 0.3% w/w, 0.4% w/w, 0.5% w/w, 0.6% w/w, 0.7% w/w, 0.8% w/w, and 0.9% w/w.

Another aspect relates to a ready-to-use oral liquid formulation, comprising: clonidine or pharmaceutically acceptable salt thereof in an amount of about 0.05 mg/ml; propylene glycol; one or more buffering agents to provide a formulation pH of from about 6 to about 8; one or more pharmaceutically acceptable excipients comprising a flavour in an amount of from about 0.01 mg/mL to about 10 mg/mL; and purified water.

Yet another aspect relates to a ready-to-use oral liquid formulation, comprising: clonidine or pharmaceutically acceptable salt thereof in an amount of about 0.05 mg/ml; propylene glycol; one or more buffering agents to provide a formulation pH of from about 6 to about 8; one or more pharmaceutically acceptable excipients comprising a sweetener in an amount of from about 0.01 mg/mL to about 10 mg/mL, a preservative in an amount of from about 0.01 mg/mL to about 10 mg/mL, and a flavour in an amount of from about 0.01 mg/mL to about 10 mg/mL; and purified water.

Yet another aspect relates to a ready-to-use oral liquid formulation, comprising: clonidine or pharmaceutically acceptable salt thereof in an amount of about 0.05 mg/mL; propylene glycol in an amount of from about 50 mg/mL to about 300 mg/mL; one or more buffering agents in an amount of from about 2 mg/mL to about 10 mg/mL to provide a formulation pH of from about 6 to about 8; one or more pharmaceutically acceptable excipients comprising a sweetener in an amount of from about 0.01 mg/mL to about 10 mg/mL, a preservative in an amount of from about 0.01 mg/mL to about 10 mg/mL, and a flavour in an amount of from about 0.01 mg/mL to about 10 mg/mL; and purified water.

Yet another aspect relates to a ready-to-use oral liquid formulation, comprising: clonidine or pharmaceutically acceptable salt thereof in an amount of about 0.05 mg/ml; propylene glycol in an amount of about 100 mg/mL; one or more buffering agents in an amount of about 8.26 mg/mL to provide a formulation pH of from about 6 to about 8; one or more pharmaceutically acceptable excipients comprising a sweetener in an amount of from about 0.01 mg/mL to about 10 mg/mL, a preservative in an amount of from about 0.01 mg/mL to about 10 mg/mL, and a flavour in an amount of from about 0.01 mg/mL to about 10 mg/mL; and purified water.

Yet another aspect relates to a ready-to-use oral liquid formulation, comprising: clonidine or pharmaceutically acceptable salt thereof in an amount of about 0.05 mg/ml; propylene glycol as a solvent in an amount of about 100 mg/mL; sodium dihydrogen phosphate in an amount of about 3.98 mg/mL, and disodium hydrogen phosphate in an amount of about 4.28 mg/mL as a buffering agent; sucralose as a sweetener in an amount of about 1 mg/mL; methyl paraben in an amount of about 1.8 mg/mL, and propyl paraben in an amount of about 0.2 mg/mL as a preservative; raspberry flavour in an amount of about 0.10 mg/mL as a flavour; and purified water.

Yet another aspect relates to a ready-to-use oral liquid formulation, comprising: clonidine or pharmaceutically acceptable salt thereof in an amount of about 0.05 mg/mL; a solvent; one or more buffering agents; a sweetener; a preservative; a flavour; and purified water.

The ready-to-use oral liquid formulation disclosed herein includes a water as a vehicle, which may include any suitable water source, such as distilled water and/or purified water. In one aspect, the ready-to-use oral liquid formulation disclosed herein includes a purified water.

Another aspect disclosed herein relates to a process for preparing a ready-to-use oral liquid formulation, comprising one or more of the following manufacturing steps. In a suitable vessel, add a suitable amount of water (e.g., 60% w/w-95% w/w (total amount) of purified water). One will appreciate that the water content expressed in percent by weight (i.e., % w/w) is based on the total weight of the formulation. Thus, for example, 1% w/w corresponds to 1 g of $H_2O$ in 100 g of the formulation. In one aspect the amount of purified water may range from 60% w/w to 95% w/w and all values in between, including, for example, 61% w/w, 62% w/w, 63% w/w, 64% w/w, 65% w/w, 66% w/w, 67% w/w, 68% w/w, 69% w/w, 70% w/w, 71% w/w, 72% w/w, 73% w/w, 74% w/w, 75% w/w, 76% w/w, 77% w/w, 78% w/w, 79% w/w, 80% w/w, 81% w/w, 82% w/w, 83% w/w, 84% w/w, 85% w/w, 86% w/w, 87% w/w, 88% w/w, 89% w/w, 90% w/w, 91% w/w, 92% w/w, 93% w/w, and 94% w/w of the total weight of liquid formulation.

The ready-to-use oral liquid formulation disclosed herein includes propylene glycol as a solvent. In one aspect the amount of propylene glycol may range from 50 mg/mL to 300 mg/mL and all values in between, including, for example, 60 mg/mL, 70 mg/mL, 80 mg/mL, 90 mg/mL, 100 mg/mL, 110 mg/mL, 120 mg/mL, 130 mg/mL, 140 mg/mL, 150 mg/mL, 160 mg/mL, 170 mg/mL, 180 mg/mL, 190 mg/mL, 200 mg/mL, 220 mg/mL, 240 mg/mL, 260 mg/mL, and 280 mg/mL.

Another aspect of the ready-to-use oral liquid formulation disclosed herein includes a propylene glycol as a solvent. In one aspect the amount of propylene glycol may range from 5% w/w to 30% w/w and all values in between, including, for example, 6% w/w, 7% w/w, 8% w/w, 9% w/w, 10% w/w, 11% w/w, 12% w/w, 13% w/w, 14% w/w, 15% w/w, 16% w/w, 17% w/w, 18% w/w, 19% w/w, 20% w/w, 21% w/w, 22% w/w, 23% w/w, 24% w/w, 25% w/w, 26% w/w, 27% w/w, 28% w/w, and 29% w/w.

In one aspect, the weight ratio of propylene glycol to purified water in the oral liquid formulation disclosed herein is about 0.8:8 to about 1:11 and all values in between, including, for example, 0.9:8.5, 1:9, 1:9.5, 1:10, 1:10.1, and 1:10.5.

Another aspect, the weight ratio of clonidine hydrochloride to propylene glycol to purified water in the oral liquid formulation disclosed herein is about 0.8:1800:18000 to 1.2:2200:22000 and all values in between, including, for example, 0.9:1850:18500, 0.9:1900:19000, 0.95:1950:19500, 1:2000:20000, 1:2000:20200, and 1.1:2100:21000.

One more aspects related to a process for preparing a ready-to-use oral liquid formulation includes that the RTU oral liquid formulation formulated at stirring speed of 1000-3000 rpm.

The ready-to-use oral liquid formulation disclosed herein is in the form of solution.

The ready-to-use oral liquid formulation disclosed herein is an immediate-release formulation.

One aspect relates to oral liquid formulation disclosed herein contained in a sealed bottle (e.g., 150 mL), where the bottle may comprise high density polyethylene (HDPE) which may include a suitable colorant (e.g., amber or brown colorant). The closure for said bottle may be comprised of a suitable polypropylene (PP), which may be child resistant (CR).

Another aspect relates to a package comprising the ready-to-use oral liquid formulation disclosed herein contained in a sealed bottle and packaging material comprising written instructions for use.

One aspect of a ready-to-use oral liquid formulation disclosed herein relates to a pharmaceutically acceptable shelf-life, which includes not more than about 1% of total clonidine-related impurities after storage for about 2-years at 25±2° C. and 60±5% relative humidity.

Accordingly, one aspect relates to a ready-to-use oral liquid formulation, comprising: clonidine or pharmaceutically acceptable salt thereof in an amount of about 0.05 mg/mL; propylene glycol; one or more buffering agents to provide a formulation pH of from about 6 to about 8; one or more pharmaceutically acceptable excipients; and purified water; wherein the formulation comprises not more than about 1% of total clonidine-related impurities after storage at 25±2° C. and 60±5% relative humidity for about 2-years.

One aspect of the ready-to-use oral liquid formulation disclosed herein relates to a method for the treatment of hypertension, which comprises administering to a patient in need thereof a therapeutically effective amount of the ready-to-use oral liquid formulation disclosed herein.

Alternatively, an aspect disclosed herein relates to the use of the ready-to-use oral liquid formulation disclosed herein for the treatment of hypertension.

As used herein, the term "therapeutically effective amount" can be understood to include an amount of clonidine hydrocholoride that is effective to prevent or treat a condition requiring antihypertensive therapy. Specific amounts of clonidine hydrochloride may be ascertained by review of the CATAPRES® PI. Therein, it is stated that the dosage and administration of clonidine hydrocholoride must be adjusted according to the patient's individual blood pressure response. CATAPRES® PI.

In view of the foregoing, it will be appreciated that a method for the treatment of hypertension comprises administering to a patient in need thereof a therapeutically effective amount of the ready-to-use oral liquid formulation disclosed herein, optionally, in combination with another antihypertensive agent.

Another aspect of the ready-to-use oral liquid formulation disclosed herein relates to a method for the treatment of prophylactic management of migraine or recurrent vascular headache, which comprises administering to a patient in need thereof a therapeutically effective amount of the ready-to-use oral liquid formulation disclosed herein.

Alternatively, an aspect disclosed herein relates to the use of the ready-to-use oral liquid formulation disclosed herein for the treatment of prophylactic management of migraine or recurrent vascular headache.

Another aspect of the ready-to-use oral liquid formulation disclosed herein relates to a method for the management of vasomotor conditions commonly associated with menopause and characterised by flushing, which comprises administering to a patient in need thereof a therapeutically effective amount of the ready-to-use oral liquid formulation disclosed herein.

Alternatively, an aspect disclosed herein relates to the use of the ready-to-use oral liquid formulation disclosed herein for the management of vasomotor conditions commonly associated with menopause and characterised by flushing.

As used herein, the term "therapeutically effective amount" can be understood to include an amount of clonidine hydrocholoride that is effective to prevent or treat a condition requiring prophylactic management of migraine or recurrent vascular headache and for the management of vasomotor conditions commonly associated with the menopause and characterised by flushing.

In view of the foregoing, it will be appreciated that a method for the treatment of migraine or recurrent vascular headache and vasomotor conditions comprises administering to a patient in need thereof a therapeutically effective amount of the ready-to-use oral liquid formulation disclosed herein, optionally, in combination with another vasodilator agent.

The following examples serve to illustrate aspects of the ready-to-use oral liquid formulation disclosed herein, it being understood that the particulars shown are by way of example only and should not be considered limiting.

EXAMPLES

Example 1. Effect of Buffer on Clonidine Hydrochloride Stability

The goal of this example was to study the effect of buffer on stability of clonidine hydrochloride. Trials were taken with the citrate buffer pH 4.5, phosphate buffer pH 7.5, and without buffer (only water), and results are summarized in below table.

TABLE 1a

Compositional details for Formulations 1A, 1B and 1C

| Ingredients | 1A | 1B | 1C |
|---|---|---|---|
| Clonidine hydrochloride | 20 mcg/mL | 20 mcg/mL | 20 mcg/mL |
| 100 mM citrate buffer pH 4.5 | — | q.s. to 1 mL | — |
| 100 mM phosphate buffer pH 7.5 | q.s. to 1 mL | — | — |
| Purified water | — | — | q.s. to 1 mL | q.s.: Quantity Sufficient; mM: millimolar; mcg: microgram; mL: milliliter

TABLE 1b

Impurity profiles for Formulations 1A, 1B and 1C

| Parameters | | 1A | 1B | 1C |
|---|---|---|---|---|
| pH of drug product | | 7.54 | 4.57 | 5.42 |
| Assay | 60° C.-7 days | 100.3% | 99.3% | 97.7% |
| Related substance | | | | |
| Single max unknown impurity | 60° C.-7 days | 0.19% | 1.5% | 0.07% |
| Total impurities | 60° C.-7 days | 0.32% | 3.0% | 0.29% |

Based on above data it can be concluded that, clonidine hydrochloride tends to degrade in the presence of citrate buffer (pH 4.5) as compared to phosphate buffer (pH 7.5) and without buffer (only water). However, to control impurities further, stability of drug was checked in different solvents i.e., glycerin, propylene glycol, and polyethylene glycol (PEG) 400 with phosphate buffer, citrate buffer, and water.

Example 2. Effect of Solvents on Clonidine Hydrochloride Stability

The goal of this study was to check the effect of solvents on stability of clonidine hydrochloride.

Example 2a: Effect of Glycerin, Propylene Glycol, and PEG 400 in Presence of Phosphate Buffer (pH 7.5)

Trials were taken with glycerin, propylene glycol, and PEG 400 in presence of phosphate buffer (pH 7.5), and results are summarized in below table.

TABLE 2a

Compositional details for Formulations 2A1, 2B1 and 2C1

| Ingredients | 2A1 | 2B1 | 2C1 |
|---|---|---|---|
| Clonidine hydrochloride | 20 mcg/mL | 20 mcg/mL | 20 mcg/mL |
| Glycerin | 200 mg | — | — |
| Propylene glycol | — | 200 mg | — |
| PEG 400 | — | — | 200 mg |
| 100 mM phosphate buffer pH 7.5 | q. s. to 1 mL | q. s. to 1 mL | q. s. to 1 mL | q. s.: Quantity Sufficient;
mM: millimolar;
mcg: microgram;
mL: milliliter

TABLE 2b

Impurity profiles for Formulations 2A1, 2B1 and 2C1

| Parameters | | 2A1 | 2B1 | 2C1 |
|---|---|---|---|---|
| pH of drug product | | 7.51 | 7.79 | 7.90 |
| Assay | 60° C.-7 days | 98.1% | 100.2% | 88.4% |
| Related substance | | | | |
| Single max unknown impurity | 60° C.-7 days | 1.8% | 0.1% | 3.7% |
| Total impurities | 60° C.-7 days | 5.2% | 0.2% | 8.22% |

Based on above data it can be concluded that, clonidine hydrochloride tends to degrade in the presence of phosphate buffer (pH 7.5) with glycerin, and PEG 400 as compared to propylene glycol. Less degradation was observed in propylene glycol, and phosphate buffer (pH 7.5).

Example 2b: Effect of Glycerin, Propylene Glycol, and PEG 400 in Presence of Citrate Buffer (pH 4.5)

Trials were taken with glycerin, propylene glycol, and PEG 400 in presence of citrate buffer (pH 4.5), and results are summarized in below table.

TABLE 2c

Compositional details for Formulations 2A2, 2B2 and 2C2

| Ingredients | 2A2 | 2B2 | 2C2 |
|---|---|---|---|
| Clonidine hydrochloride | 20 mcg/mL | 20 mcg/mL | 20 mcg/mL |
| Glycerin | 200 mg | — | — |
| Propylene glycol | — | 200 mg | — |
| PEG 400 | — | — | 200 mg |
| 100 mM citrate buffer pH 4.5 | q. s. to 1 mL | q. s. to 1 mL | q. s. to 1 mL | q. s.: Quantity Sufficient;
mM: millimolar;
mcg: microgram;
mL: milliliter

TABLE 2d

Impurity profiles for Formulations 2A2, 2B2 and 2C2

| Parameters | | 2A2 | 2B2 | 2C2 |
|---|---|---|---|---|
| pH of drug product | | 4.65 | 4.80 | 4.92 |
| Assay | 60° C.-7 days | 105.6% | 101.4% | 104.8% |
| Related substance | | | | |
| Single max unknown impurity | 60° C.-7 days | 0.42% | 0.07% (BQL) | 0.22% |
| Total impurities | 60° C.-7 days | 1.3% | 0.28% | 0.75% |

BQL: Below Quantification Limit

Based on above data it can be concluded that, clonidine hydrochloride tends to degrade in the presence of citrate buffer (pH 4.5) with glycerin, and PEG 400 as compared to propylene glycol. Less degradation was observed in propylene glycol, and citrate buffer (pH 4.5).

Example 2c: Effect of Glycerin, Propylene Glycol, and PEG 400 in Presence of Purified Water Trials were taken with glycerin, propylene glycol, and PEG 400, in presence of purified water and results are summarized in below table.

TABLE 2e

Compositional details for Formulations 2A3, 2B3 and 2C3

| Ingredients | 2A3 | 2B3 | 2C3 |
|---|---|---|---|
| Clonidine hydrochloride | 20 mcg/mL | 20 mcg/mL | 20 mcg/mL |
| Glycerin | 200 mg | — | — |
| Propylene glycol | — | 200 mg | — |
| PEG 400 | — | — | 200 mg |
| Purified water | q. s. to 1 mL | q. s. to 1 mL | q. s. to 1 mL | q. s.: Quantity Sufficient;
mM: millimolar;
mcg: microgram;
mL: milliliter

TABLE 2f

Impurity profiles for Formulations 2A3, 2B3 and 2C3

| Parameters | | 2A3 | 2B3 | 2C3 |
|---|---|---|---|---|
| pH of drug product | | 5.28 | 5.38 | 6.49 |
| Assay | 60° C.-7 days | 103.8% | 102.6% | 38.6% |
| Related substance | | | | |
| Single max unknown impurity | 60° C.-7 days | 1.5% | 0.06% | 22.3% |
| Total impurities | 60° C.-7 days | 3.9% | 0.23% | 54.5% |

Based on above data it can be concluded that, clonidine hydrochloride tends to degrade in the presence of purified water with glycerin, and PEG 400 as compared to propylene glycol. Less degradation was observed in propylene glycol, and purified water.

Based on above data it can be concluded that, trials with propylene glycol in citrate buffer, phosphate buffer, and purified water showed lower levels of impurities as compared to trials with glycerin, and PEG 400 in citrate buffer, phosphate buffer and purified water. However, purified water alone shown significant variation in pH. Hence, based on total impurity, and to stabilize the pH, phosphate buffer with propylene glycol is selected for further development.

Example 3. Trials with Different Concentration of Propylene Glycol with Purified Water as a Vehicle Trials with different concentration of propylene glycol (without propylene glycol, 50 mg/mL, 75 mg/mL, 100 mg/mL, 200 mg/mL, and 300 mg/mL) were assessed and results are summarized in below table.

TABLE 3

Compositional details for Formulations 1C, 3A1 to 3A5, and its impurity profile

| Trial No. | 1C | 3A1 | 3A2 | 3A3 | 3A4 | 3A5 |
|---|---|---|---|---|---|---|
| Ingredients | Quantity (mg/mL) | | | | | |
| Clonidine hydrochloride | 0.02 | 0.1 | 0.1 | 0.1 | 0.1 | 0.1 |
| Sucralose | — | 1 | 1 | 1 | 1 | 1 |
| Sodium benzoate | — | 1 | 1 | 1 | 1 | 1 |
| Frozen peppermint | — | 0.1 | 0.1 | 0.1 | 0.1 | 0.1 |
| Propylene glycol | 0 | 50 | 75 | 100 | 200 | 300 |
| Purified water (q. s. to 1 mL) | 999.98 | 947.80 | 872.80 | 897.80 | 797.80 | 697.80 |

| Parameters | Initial | 60° C. 7 days | Initial | 60° C. 7 days | Initial | 60° C. 7 days | Initial | 60° C. 7 days | Initial | 60° C. 7 days | Initial | 60° C. 7 days |
|---|---|---|---|---|---|---|---|---|---|---|---|---|
| Description | Clear colourless solution | | | | | | | | | | | |
| pH | — | 4.60 | 6.31 | 6.27 | 6.35 | 6.25 | 6.11 | 5.92 | 6.18 | 6.09 | 6.36 | 6.24 |
| Assay | — | 97.7% | 98.4% | 97.9% | 97.7% | 97.3% | 100.5% | 100.5% | 102.8% | 101.9% | 104.2% | 102.3% |
| Single max unknown impurity | — | 0.07% | ND | 0.18% | BQL | 0.08% (BQL) | ND | ND | ND | ND | ND | ND |
| Total impurities | — | 0.29% | 0% | 0.35% | 0% | 0% | 0% | 0% | 0% | 0% | 0% | 0% | q. s.: Quantity Sufficient;
mg: milligram;
mL: milliliter;
BQL: Below Quantification Limit;
ND: Not Detected Based on above data it can be concluded that, trials with propylene glycol (≥100 mg/mL) showed lower levels of impurities as compared to trials with propylene glycol (<100 mg/mL). Further, assay level was also found stable and well within the acceptable limit at 60° C. for 7 days for the trials with propylene glycol (≥100 mg/mL). Hence, propylene glycol concentration 100 mg/mL is finalized for further development.

Example 4. Effect of Propylene Glycol with Phosphate Buffer (pH 7.5) on Clonidine Hydrochloride Solution Stability The goal of this study was to check the effect of propylene glycol on stability of clonidine hydrochloride solution formulation. Two trials were taken for this, one with propylene glycol, and another one without propylene glycol in the formulation.

TABLE 4a

Compositional details for Formulations 4A1 and 4A2

| | | Trial No. | 4A1 | 4A2 |
|---|---|---|---|---|
| Sr. No. | Ingredients | Function | Quantity (mg/mL) | |
| 1 | Clonidine hydrochloride | API | 0.1 | 0.1 |
| 2 | Sucralose | Sweetener | 1 | 1 |
| 3 | Methyl paraben | Preservative | 1.8 | 1.8 |
| 4 | Propyl Paraben | Preservative | 0.2 | 0.2 |
| 5 | Frozen peppermint | Flavour | 0.1 | 0.1 |
| 6 | Propylene glycol | Solvent | — | 100 |
| 7 | Sodium phosphate monobasic dihydrate | Buffering agent | 1.7 | 1.7 |
| 8 | Sodium phosphate dibasic dihydrate | Buffering agent | 10.1 | 10.1 |
| 9 | Purified water | Vehicle | q. s. to 1 mL | q. s. to 1 mL | mg: milligram;
mL: milliliter

Manufacturing Procedure for Trial No.: 4A1
(a) Take 90% of total quantity of purified water.
(b) Heat the purified water up to 80° C.
(c) Dispense and add methyl paraben in it and mix it at 80° C. till completely solubilized.
(d) Dispense and add propyl paraben in it and mix it at 80° C. till completely solubilized.
(e) Cool down the solution naturally up to room temperature.
(f) Dispense and add sodium phosphate dibasic dihydrate in it and mix it till completely solubilized.
(g) Dispense and add sodium phosphate monobasic dihydrate in it and mix it till completely solubilized.
(h) Dispense and add sucralose in it and mix it till completely solubilized.
(i) Dispense and add clonidine hydrochloride with stirring till completely solubilized.
(j) Dispense and add frozen peppermint flavour with stirring till completely dispersed.
(k) Make up the final volume using purified water.

Manufacturing Procedure for Trial No.: 4A2
(a) Take 30% of total quantity of purified water.
(b) Dispense and add propylene glycol in it and mix it till completely solubilized.
(c) Heat the purified water up to 50° C.
(d) Dispense and add methylparaben in it and mix it at 50° C. till completely solubilized.
(e) Dispense and add propylparaben in it and mix it at 50° C. till completely solubilized.
(f) Cool down the solution naturally up to room temperature.
(g) Add 40% of purified water in it mix it.
(h) Dispense and add monobasic sodium phosphate dihydrate in it and mix it till completely solubilized.
(i) Dispense and add dibasic sodium phosphate dihydrate in it and mix it till completely solubilized.
(j) Dispense and add sucralose in it and mix it till completely solubilized.
(k) Dispense and add clonidine hydrochloride with stirring till completely solubilized.
(l) Dispense and add frozen peppermint flavour with stirring till completely dispersed.
(m) Make up the final volume using purified water.

TABLE 4b

Impurity profiles for Formulations 4A1

| | Pack Details | | 115 CC HDPE bottle packed in secondary white box | | | | | | |
|---|---|---|---|---|---|---|---|---|---|
| | | | | 25° C./60% RH | | | 40° C./NMT 25% RH | | |
| Sr. No. | Parameters | Specification | Initial | 1 Month (I) | 3 Months (I) | 6 Months (I) | 1 Month (I) | 3 Months (I) | 6 Months (I) |
| 1 | Description | | Clear colorless solution | | | | | | |
| 2 | pH | 6.0 to 8.0 | 7.47 | 7.46 | 7.50 | 7.41 | 7.44 | 7.40 | 7.30 |
| 3 | Assay | 90.0%-110.0% | 100.5% | 101.1% | 100.6% | 100.4% | 100.6% | 99% | 99.2% |
| 4 | Assay of methyl paraben | 60%-110.0% | 96.5% | 95.4% | 94.5% | 93.2% | 87.6% | 74.7% | 64.6% |
| 5 | Assay of propyl paraben | 60%-110.0% | 98.6% | 97.6% | 96.6% | 97.1% | 93.6% | 86.5% | 82.8% |
| | | | Related substances (By HPLC) | | | | | | |
| 6 | Single max unknown impurity | NMT 0.5% | ND | BQL | 0.04% (BQL) | BQL | BQL | 0.09% (BQL) | 0.16% |
| | Total impurities | NMT 1.0% | 0% | 0% | 0% | 0% | 0% | 0% | 0.16% |

ND: Not Detected;
NMT: Not More Than;
BQL: Below Quantification Limit;
I: Inverted Observation: From the above data, it is observed that pH was stable in 25° C./60% RH and very slight decrease in 40° C./NMT 25% RH. Assay is stable throughout stability in both conditions. Related substances are not observed in 25° C./60% RH and slight increase in 40° C./NMT 25% RH but well within limit. Whereas assay of preservatives is decreased in both conditions.

TABLE 4c

Impurity profiles for Formulations 4A2

| Sr. No. | Parameters | Specification | Pack Details: 115 CC HDPE bottle packed in secondary white box | | | | | |
|---|---|---|---|---|---|---|---|---|
| | | | | 25° C./60% RH | | | 40° C./NMT 25% RH | |
| | | | Initial | 1 Month (I) | 3 Months (I) | 6 Months (I) | 1 Month (I) | 3 Months (I) | 6 Months (I) |
| 1 | Description | Clear colorless solution | | | | | | | |
| 2 | pH | 6.0 to 8.0 | 7.58 | 7.57 | 7.52 | 7.52 | 7.55 | 7.46 | 7.52 |
| 3 | Assay | 90.0%-110.0% | 100.3% | 100.2% | 98.8% | 98.9% | 100.0% | 98.6% | 98.4% |
| 4 | Assay of methyl paraben | 60%-110.0% | 96.4% | 93.6% | 91.9% | 88.5% | 84.8% | 69.7% | 57.6% |
| 5 | Assay of propyl paraben | 60%-110.0% | 98.5% | 96.2% | 94.8% | 95.3% | 92.9% | 86.2% | 84.8% |
| | Related substances (By HPLC) | | | | | | | | |
| 6 | Single max unknown impurity | NMT 0.5% | ND | 0.02% (BQL) | 0.01% (BQL) | 0.02% (BQL) | 0.02% (BQL) | 0.03% (BQL) | 0.03% (BQL) |
| | Total impurities | NMT 1.0% | 0% | 0% | 0% | 0% | 0% | 0% | 0% |

ND: Not Detected;
NMT: Not More Than;
BQL: Below Quantification Limit;
I: Inverted Observation: From the above data, it is observed that assay and pH is stable in 25° C./60% RH and 40° C./NMT 25% RH condition. Degradation is not observed in 25° C./60% RH and 40° C./NMT 25% RH. Whereas assay of methyl paraben is decreased in both conditions and out of specification in 40° C./NMT 25% RH.

Conclusion: From the observation of trial Nos.: 4A1 and 4A2, it is concluded that related substances are controlled by presence of propylene glycol. To control the degradation of methyl paraben and propyl paraben, pH 7.0 will be evaluated in presence of propylene glycol.

Example 5: Effect of Phosphate Buffer (pH 7.0) with Propylene Glycol as Co-Solvent The goal of this study is to check stability of clonidine hydrochloride in the phosphate buffer (pH 7.0) with propylene glycol as co-solvent and to check stability of methyl paraben and propyl paraben at 7.0 pH phosphate buffer. Hence, trial was prepared with propylene glycol in phosphate buffer (pH 7.0) and loaded for stability testing.

TABLE 5a

Compositional details for Formulations 5A1 and 5A2

| Sr. No. | Ingredients | Function | 5A1 Quantity (mg/mL) | 5A2 Quantity (mg/mL) |
|---|---|---|---|---|
| 1 | Clonidine hydrochloride | API | 0.1 | 0.05 |
| 2 | Sucralose | Sweetener | 1 | 1 |
| 3 | Methyl paraben | Preservative | 1 | 1.8 |
| 4 | Propyl paraben | Preservative | 0.2 | 0.2 |
| 5 | Frozen peppermint | Flavour | 0.1 | 0.1 |
| 6 | Propylene glycol | Solvent | 100 | 100 |
| 7 | Sodium phosphate monobasic dihydrate | Buffering agent | 3.98 | 3.98 |
| 8 | Sodium phosphate dibasic dihydrate | Buffering agent | 4.28 | 4.28 |
| 9 | Purified water | Vehicle | q. s. to 1 mL | q. s. to 1 mL |

Manufacturing Procedure (a) Take 30% of total quantity of purified water.
(b) Dispense and add propylene glycol in it and mix it till completely solubilized.
(c) Heat the purified water up to 50° C.
(d) Dispense and add methylparaben in it and mix it at 50° C. till completely solubilized.
(e) Dispense and add propylparaben in it and mix it at 50° C. till completely solubilized.
(f) Cool down the solution naturally up to room temperature.
(g) Add 40% of purified water in it and mix it.
(h) Dispense and add monobasic sodium phosphate dihydrate in it and mix it till completely solubilized.
(i) Dispense and add dibasic sodium phosphate dihydrate in it and mix it till completely solubilized.

(j) Dispense and add sucralose in it and mix it till completely solubilized.
(k) Dispense and add clonidine hydrochloride with stirring till completely solubilized.
(l) Dispense and add frozen peppermint flavour with stirring till completely dispersed.
(m) Make up the final volume using purified water.

TABLE 5b

Impurity profiles for Formulations 5A1

| Pack Details | | | 115 CC HDPE bottle packed in secondary white box | | | | | | | |
|---|---|---|---|---|---|---|---|---|---|---|
| | | | | 25° C./60% RH | | | | 40° C./NMT 25% RH | | |
| Sr. No. | Parameters | Specification | Initial | 1M (I) | 3M (I) | 6M (I) | 9M (I) | 1M (I) | 3M (I) | 6M (I) |
| 1 | Description | | Clear colorless solution | | | | | | | |
| 2 | pH | 6.0 to 8.0 | 6.83 | NP | 6.84 | 6.80 | 6.91 | NP | 6.80 | 6.78 |
| 3 | Assay | 90.0%-110.0% | 101.4% | 99.5% | 100.2% | 100.2% | 100.6% | 99.3% | 100.0% | 100.6% |
| 4 | Assay of methyl paraben | 60%-110.0% | 100.3% | 97.8% | 97.9% | 95.6% | 96.2% | 94.8% | 90.3% | 82.3% |
| 5 | Assay of propyl paraben | 60%-110.0% | 100.7% | 98.0% | 99.7% | 96.7% | 97.3% | 96.4% | 95.7% | 90.5% |
| | | | Related substances (By HPLC) | | | | | | | |
| 6 | Single max unknown impurity | NMT 0.5% | 0.05% (BQL) | 0.05% (BQL) | 0.05% (BQL) | 0.02% (BQL) | 0.06% (BQL) | 0.04% (BQL) | 0.03% (BQL) | 0.02% (BQL) |
| | Total impurities | NMT 1.0% | 0% | 0% | 0% | 0% | 0% | 0% | 0% | 0% |

NMT: Not More Than;
BQL: Below Quantification Limit;
NP: Not Performed;
I: Inverted;
M: month/months Observation: From the above data, it is observed that each of assay and pH is stable; and that related substances were not observed at 25° C./60% RH up to 9 months and 40° C./NMT 25% RH up to 6 months. Assay of preservative is controlled at 25° C./60% RH and decrease up to 82.3% of methyl paraben and 90.5% of propyl paraben in 40° C./NMT 25% RH up to 6 months which is very less decrement comparatively to phosphate buffer (pH 7.5).

Conclusion: From the above observation, it is concluded that degradation of preservative is prevented at pH 7.0 and well within specification limit however preservative is required to control the microorganism growth in formulation throughout shelf life.

TABLE 5c

Impurity profiles for Formulations 5A2

| Pack Details | | | 115 CC HDPE bottle packed in secondary white box | | | | | | | |
|---|---|---|---|---|---|---|---|---|---|---|
| | | | | 25° C./60% RH | | | | 40° C./NMT 25% RH | | |
| Sr. No. | Parameters | Specification | Initial | 1M (I) | 3M (I) | 6M (I) | 9M (I) | 1M (I) | 3M (I) | 6M (I) |
| 1 | Description | | Clear colorless solution | | | | | | | |
| 2 | pH | 6.0 to 8.0 | 6.83 | 6.81 | 6.8 | 6.79 | 6.91 | 6.79 | 6.81 | 6.8 |
| 3 | Assay | 90.0%-110.0% | 101.4% | 104.1% | 104.6% | 104.5% | 104.5% | 104.2% | 104.2% | 103.8% |
| 4 | Assay of methyl paraben | 60%-110.0% | 100.3% | 99.3% | 98.7% | 96.5% | 96.6% | 95.7% | 91.2% | 82.2% |
| 5 | Assay of propyl paraben | 60%-110.0% | 100.7% | 98.2% | 98.7% | 96.5% | 96.7% | 97.1% | 95.4% | 90.5% |

TABLE 5c-continued

Impurity profiles for Formulations 5A2

| Pack Details | | | 115 CC HDPE bottle packed in secondary white box | | | | | | | |
|---|---|---|---|---|---|---|---|---|---|---|
| | | | 25° C./60% RH | | | | | 40° C./NMT 25% RH | | |
| Sr. No. | Parameters | Specification | Initial | 1M (I) | 3M (I) | 6M (I) | 9M (I) | 1M (I) | 3M (I) | 6M (I) |
| | | | Related substances (By HPLC) | | | | | | | |
| 6 | Single max unknown impurity | NMT 0.5% | 0.05% (BQL) | — | — | ND | — | ND | ND | ND |
| | Total impurities | NMT 1.0% | 0% | — | — | 0% | — | 0% | 0% | 0% |

ND: Not Detected;
NMT: Not More Than;
BQL: Below Quantification Limit;
I: inverted;
M: month/months Observation: From the above data, it is observed that each of assay and pH is stable; and that related substances are not observed in 25° C./60% RH up to 9 months and 40° C./NMT 25% RH up to 6 months. Assay of preservative is controlled at 25° C./60% RH and decreased up to 82.2% of methyl paraben and 90.5% of propyl paraben at 40° C./NMT 25% RH up to 6 months which is very less decrement comparatively to phosphate buffer (pH 7.5).

Conclusion: From the above observation, it is concluded that degradation of preservative is prevented at 7.0 pH and well within specification limit however preservative is required to control the microorganism growth in formulation throughout shelf life.

Example 6: Preservative Concentration Optimization

To find out the effective preservative concentration, trials were performed at different concentration of methyl paraben and propyl paraben. The formulation was further tested to check for efficacy of the antimicrobial preservatives and results are summarized in below table.

TABLE 6a

Compositional details of formulations used for preservative efficacy test (6A1 to 6A5)

| Sr. No. | Ingredients | Function | 6A1 (50%) | 6A2 (60%) | 6A3 (70%) | 6A4 (80%) | 6A5 (100%) |
|---|---|---|---|---|---|---|---|
| | | | Quantity (mg/mL) | | | | |
| 1 | Clonidine hydrochloride | API | 0.1 | 0.1 | 0.1 | 0.1 | 0.1 |
| 2 | Sucralose | Sweetener | 1 | 1 | 1 | 1 | 1 |
| 3 | Methyl paraben | Preservative | 0.9 | 1.08 | 1.26 | 1.44 | 1.8 |
| 4 | Propyl paraben | Preservative | 0.1 | 0.12 | 0.14 | 0.16 | 0.2 |
| 5 | Raspberry flavour | Flavour | — | 0.1 | 0.1 | — | — |
| 6 | Frozen peppermint | Flavour | 0.1 | — | — | 0.1 | 0.1 |
| 7 | Propylene glycol | Solvent | 100 | 100 | 100 | 100 | 100 |
| 8 | Sodium phosphate monobasic dihydrate | Buffering agent | 3.98 | 3.98 | 3.98 | 3.98 | 3.98 |
| 9 | Sodium phosphate dibasic dihydrate | Buffering agent | 4.28 | 4.28 | 4.28 | 4.28 | 4.28 |
| 10 | Purified water | Vehicle | q. s. to 1 mL | q. s. to 1 mL | q. s. to 1 mL | q. s. to 1 mL | q. s. to 1 mL |

TABLE 6b

Results for preservative efficacy test (6A1 to 6A5)

| | Initial | | | | | Day 14 | | | | | | Day 28 | | | | | |
|---|---|---|---|---|---|---|---|---|---|---|---|---|---|---|---|---|---|
| Trial No. | 6A1 | 6A2 | 6A3 | 6A4 | 6A5 | Limit | 6A1 | 6A2 | 6A | 6A4 | 6A5 | Limit | 6A1 | 6A2 | 6A3 | 6A4 | 6A5 |
| Methyl paraben (mg/mL) | 0.9 | 1.08 | 1.26 | 1.44 | 1.8 | | 0.9 | 1.08 | 1.26 | 1.44 | 1.8 | | 0.9 | 1.08 | 1.26 | 1.44 | 1.8 |
| Propyl paraben (mg/mL) | 0.1 | 0.12 | 0.14 | 0.16 | 0.2 | | 0.1 | 0.12 | 0.14 | 0.16 | 0.2 | | 0.1 | 0.12 | 0.14 | 0.16 | 0.2 |

TABLE 6b-continued

| Organism | Log10 value | | | | | | Results in Log10 reduction | | | | | | | | | | |
|---|---|---|---|---|---|---|---|---|---|---|---|---|---|---|---|---|---|
| E. coli | 6.52 | 6.03 | 6.03 | 6.52 | 6.52 | NLT 3 | 5.52 | 5.03 | 5.03 | 5.52 | 5.52 | NI | NI | NI | NI | NI | NI |
| S. aureus | 6.88 | 6.17 | 6.17 | 6.88 | 6.88 | | 2.39 | 5.17 | 5.17 | 5.88 | 5.88 | | NI | NI | NI | NI | NI |
| P. aeruginosa | 6.89 | 6.58 | 6.58 | 6.89 | 6.89 | | 2.98 | 5.58 | 5.58 | 5.89 | 5.89 | | NI | NI | NI | NI | NI |
| C. albicans | 6.91 | 6.15 | 6.15 | 6.91 | 6.91 | NLT 1 | 1.21 | 3.38 | 3.41 | 4.24 | 5.91 | NI | NI | NI | NI | NI | NI |
| A. brasiliensis | 6.83 | 6.17 | 6.17 | 6.83 | 6.83 | | 5.83 | 5.17 | 5.17 | 5.83 | 5.83 | | NI | NI | NI | NI | NI |

NLT: Not Less Than;
NI: No increase in number of viable micro-organisms compared to the previous reading.

Conclusion

Antimicrobial effectiveness testing was conducted on the product having methyl paraben (MP) concentration 1.08 mg/mL, 1.26 mg/mL, 1.44 mg/mL, and 1.8 mg/mL, and propyl paraben (PP) concentration 0.12 mg/mL, 0.14 mg/mL, 0.16 mg/mL, and 0.2 mg/mL which was passed. The batch prepared with 0.9 mg/mL MP and 0.1 mg/mL of PP is failing S. aureus and P. aeruginosa and passing at boarder line in presence of C. albicans. Therefore, based on these results the final formulation has 1.8 mg/mL concentration of methyl paraben and 0.2 mg/ml concentration of propyl paraben at near shelf life. Shelf-life specifications of methyl paraben at 60% of labelled amount and propyl paraben at 60% of labelled amount in the product is justified. Preservative levels within the shelf-life specifications would be capable of preventing growth of any inadvertent microbial contamination during the use of the product.

Example 7: Stress Stability Study

Stress study trial was performed to evaluate and verify the finished product processing and handling during the storage and transportation.

TABLE 7a

Compositional details of formulations used for stress stability study (Trial No. 7A)

| Sr. No. | Ingredients | Function | Quantity (mg/mL) |
|---|---|---|---|
| 1 | Clonidine hydrochloride | API | 0.1 |
| 2 | Sucralose | Sweetener | 1 |
| 3 | Methyl paraben | Preservative | 1.8 |
| 4 | Propyl paraben | Preservative | 0.2 |
| 5 | Frozen peppermint | Flavour | 0.1 |
| 6 | Propylene glycol | Solvent | 100 |
| 7 | Sodium phosphate monobasic dihydrate | Buffering agent | 1.7 |
| 8 | Sodium phosphate dibasic dihydrate | Buffering agent | 10.1 |
| 9 | Purified water | Vehicle | q. s. to 1 mL |

7a. Photostability Studies

Clonidine hydrochloride oral solution was prepared using standard batch manufacturing procedure and filled into the 150 mL HDPE bottle subjected to a photo stability study. The total light exposure would provide an overall illumination of 1.2 million lux hours and an integrated near ultraviolet energy of not less than 200-watt hours/square meter. White opaque HDPE bottle to evaluate the primary pack.

White opaque HDPE bottle with secondary pack (cartons) to simulate the actual market pack.

Product filled in clear PET bottle.

Results of the testing at the end of the light exposure are shown in table below.

TABLE 7b

Results for photostability studies (Trial No. 7A)

| Sr. No. | Test | Specification/ Limits | Initial | HDPE bottle (Primary pack) | HDPE bottle (Secondary pack) | Clear PET bottle |
|---|---|---|---|---|---|---|
| 1 | Description | | Clear colorless solution | | | |
| 2 | pH | 6.0 to 8.0 | 7.60 | 7.53 | 7.53 | 7.53 |
| 3 | Assay | 90.0%-110.0% | 98.1% | 96.8% | 97.5% | 95.8% |
| 4 | Assay of methyl paraben | 60%-110.0% | 97.1% | 96.4% | 95.6% | 96.0% |
| 5 | Assay of propyl paraben | 60%-110.0% | 97.4% | 96.6% | 97.1% | 97.1% |
| | Related substances (By HPLC) | | | | | |
| 6 | Single maximum unknown impurity | NMT 0.5% | BQL | BQL | BQL | 0.12% (RRT 1.77) |
| | Total impurities | NMT 1.0% | 0% | 0% | 0% | 0.12% |

NMT: Not More Than;
BQL: Below Quantification Limit;
RRT: Relative Retention Time Conclusion As per the results in above table, when product was exposed to light in clear PET bottle single maximum unknown impurity was detected 0.12%. Therefore, it is concluded that the product is getting affected by exposure to light. However, when the product is stored in white opaque HDPE bottles without carton (primary pack) and HDPE bottles with carton (secondary pack), both products were found stable. Hence, based on these data, it may be concluded that the clonidine-containing product exhibits photosensitivity.

7b. Freeze Thaw Studies

The freeze-thaw studies aim to understand the stability characteristics of the product when subjected to extreme temperature conditions that may be encountered during the drug product distribution process. Freeze thaw studies were performed on clonidine hydrochloride oral solution (100 mcg/mL). The product bottles were subjected to a temperature cycle of −20° C.±5° C. for 2 days followed by 40° C.±2° C. for 2 days. The product bottles were subjected to three such cycles. A set of product bottles were withdrawn at the end of third cycle and analysed.

TABLE 7c

Results of Freeze thaw study (Trial No. 7A)

| Sr. No. | Test | Specification/ Limits | Initial | 3$^{rd}$ cycle |
|---|---|---|---|---|
| 1 | Description | Clear colorless solution | | |
| 2 | pH | 6.0 to 8.0 | 7.60 | 7.54 |
| 3 | Assay | 90.0%-110.0% | 98.1% | 97.3% |
| 4 | Assay of methyl paraben | 60%-110.0% | 97.1% | 96.6% |
| 5 | Assay of propyl paraben | 60%-110.0% | 97.4% | 97.2% |
|   | Related substances | | | |
| 6 | Single max unknown impurity | NMT 0.5% | BQL | BQL |
|   | Total impurities | NMT 1.0% | 0% | 0% |

NMT: Not More Than;
BQL: Below Quantification Limit

Conclusion

When product bottles were exposed to the −20° C. for 2 days for 3$^{rd}$ cycle, HDPE container remain as such and able to withstand the extreme freezing condition. Also, it was observed that when product temperature returns to ambient temperature, product gains its original physical characteristics. Analytical results indicated that the product stability was not affected by the extreme temperature conditions encountered by the drug product. The product characteristics at the end of the third cycle were comparable to the initial product profile. Thus, the product can withstand limited temperature excursions during the transportation/distribution process.

7c. Water Loss Study

The objective of this study is to evaluate permeation of water from semi-permeable container. The purpose of this study is to determine the water loss from packaging (115 mL HDPE bottles with PP CR Closure) used for the product clonidine hydrochloride oral solution (50 mcg/mL). The outcome of this study defines a water loss percentage from the packaging for the clonidine hydrochloride oral solution (50 mcg/mL) at stability condition. Water loss study is conducted 40° C.±2° C./NMT 25% RH at (0, 3, and 6 months) and 25° C.±2° C./NMT 60%±5% RH (0, 3, 6, 9, and 12 months) for trial No. 7B and percentage water loss was measured. The results are summarized in below table.

TABLE 7d

Compositional details of formulations used for water loss study (Trial No. 7B)

| Ingredients | Quantity (mg/mL) |
|---|---|
| Clonidine hydrochloride | 0.05 |
| Sucralose | 1 |
| Methyl paraben | 1.8 |
| Propyl paraben | 0.2 |
| Frozen peppermint | 0.1 |
| Propylene glycol | 100 |
| Sodium phosphate monobasic dihydrate | 1.7 |
| Sodium phosphate dibasic dihydrate | 10.1 |
| Purified water | q. s. to 1 mL |

TABLE 7e

Results of water loss study
Pack Details: 115 CC HDPE bottle packed in secondary white box

| | 40° C. ± 2° C./NMT 25% RH | | | 25° C. ± 2° C./NMT 60% ± 5% RH | | |
|---|---|---|---|---|---|---|
| Test | 1 Month | 3 Months | 6 Months | 1 Month | 3 Months | 6 Months |
| Initial weight of container (g) | 125.59 | 127.26 | 124.81 | 122.24 | 124.92 | 123.90 |
| After weight of container (g) | 125.55 | 127.16 | 124.53 | 122.24 | 124.89 | 123.88 |
| % Water loss | 0.03 | 0.08 | 0.22 | 0.00 | 0.02 | 0.02 |

Conclusion

As per data reported in above table, it was observed that % water loss was found not more than 1.0% at accelerated stability condition and at room temperature stability condition which is well within the specification i.e. not more than 5.0%. It is concluded that there is no significant change in weight of container due to water loss up to 6 months at accelerated stability condition and 6 months at room temperature stability condition.

Example 8: Effect of Flavours on Finished Product

The goal of this study was to evaluate the effect of frozen peppermint and raspberry flavour on finished drug product at 60° C. for 7 days to ensure raspberry flavour is equally compatible as frozen peppermint flavour.

TABLE 8a

Compositional details of formulations of clonidine hydrochloride oral solution (Trial Nos. 8A-8C)

| Trial No. | 8A | 8B | 18C |
|---|---|---|---|
| Ingredients | Quantity (mg/mL) | | |
| Clonidine hydrochloride | 0.1 | 0.1 | 0.05 |
| Sucralose | 1 | 1 | 1 |
| Methyl paraben | 2.85 | 2.85 | 2.85 |
| Propyl paraben | 0.27 | 0.27 | 0.27 |
| Frozen peppermint | 0.1 | — | — |
| Raspberry flavour | — | 0.1 | 0.1 |
| Propylene glycol | 100 | 100 | 100 |
| Sodium phosphate monobasic dihydrate | 3.98 | 3.98 | 3.98 |
| Sodium phosphate dibasic dihydrate | 4.28 | 4.28 | 4.28 |
| Purified water | q. s. to 1 mL | q. s. to 1 mL | q. s. to 1 mL |

TABLE 8b

Impurity profiles of clonidine hydrochloride oral solution (Trial Nos. 8A-8C)

| Pack Details | | 115 CC HDPE bottle packed in secondary white box | | | | | |
|---|---|---|---|---|---|---|---|
| Trial No. | | 8A | | 8B | | 8C | |
| Test parameters | Storage Condition | Initial | 60° C.-7 days | Initial | 60° C.-7 days | Initial | 60° C.-7 days |
| Description | | Clear colorless solution | | | | | |
| pH | 6.5 to 7.5 | 6.87 | 6.86 | 6.88 | 6.87 | 6.89 | 6.88 |
| Assay | 90.0% to 110.0% | 99.1% | 97.3% | 99.7% | 99.7% | 103.4% | 103.3% |
| Content of methyl paraben | 60.0% to 110.0% | 96.2% | 90.0% | 100.0% | 93.2% | 100.1% | 93.9% |
| Content of propyl paraben | 60.0% to 110.0% | 97.1% | 92.1% | 98.5% | 96.0% | 98.6% | 96.0% |
| Color and Achromicity | # | Complies | Complies | Complies | Complies | Complies | Complies |
| Related Substances | | | | | | | |
| Single max unknown imp | NMT 0.5% | 0.05% (BQL) | ND | ND | ND | ND | ND |
| Total Impurities | NMT 1.0% | 0% | 0% | 0% | 0% | 0% | 0% |

-Intensity of the color of the sample preparation should not more intense than the matching fluid;
NMT: Not More Than;
BQL: Below Quantification Limit;
ND: Not Detected Observation and conclusion: From the above results both flavours were found compatible with finished product.

Example 9: Stability Data

The goal of thermal formulation development was to evaluate the thermal stability of the final composition, formula presented in table below.

TABLE 9a

Compositional details of formulations for stability data

| Trial No. | 9A | 9B |
|---|---|---|
| Ingredients | Quantity (mg/mL) | |
| Clonidine hydrochloride | 0.1 | 0.05 |
| Sucralose | 1 | 1 |
| Methyl paraben | 1.8 | 1.8 |
| Propyl paraben | 0.2 | |0.2 |
| Raspberry flavour | 0.1 | 0.1 |
| Propylene glycol | 100 | 100 |
| Sodium phosphate monobasic dihydrate | 3.98 | 3.98 |
| Sodium phosphate dibasic dihydrate | 4.28 | 4.28 |
| Purified water | q. s. to 1 mL | q. s. to 1 mL |

Manufacturing Process
   (a) Add 70% amount of purified water.
   (b) Add propylene glycol in to it and mix it. Heating the solution up to 80° C.
   (c) Add methyl paraben and propyl paraben in to it and mix it. Cooling down the solution at room temperature.
   (d) Add sodium phosphate monobasic dihydrate and sodium phosphate dibasic dihydrate in to it and mix it.
   (e) Add sucralose in to it and mix it.
   (f) Prepare a concentrate solution of clonidine hydrochloride and add in to it and mix it.
   (g) Add raspberry flavour in to it and mix it.
   (h) Make up the final volume by using purified water. Mix it.
   (i) Filter the final solution by using suitable filter.
   (j) Filing of the final solution in suitable container and labelling it and packaged the final container in suitable carton.

TABLE 9b

Results of stability study of clonidine hydrochloride oral solution, 100 mcg/mL
(Trial No. 9A)

| | Pack Details | | HDPE bottle packed in secondary white box | | | | | |
| --- | --- | --- | --- | --- | --- | --- | --- | --- |
| | | | 25° C. ± 2° C./60 ± 5% RH | | | 40° C. ± 2° C./NMT 25% RH | | |
| Test parameters | Storage condition | Initial | 1 Month (I) | 3 Months (I) | 6 Months (I) | 1 Month (1) | 3 Months (I) | 6 Months (I) |
| Description | | | Clear colorless solution | | | | | |
| pH | 6.5 to 7.5 | 6.89 | 6.92 | 6.88 | 6.86 | 6.89 | 6.86 | 6.82 |
| Assay | 90.0% to 110.0% | 98.4% | 101.2% | 99.7% | 99.1% | 99.0% | 98.3% | 98.2% |
| Content of methyl paraben | 60.0% to 110.0% | 100.3% | 99.7% | 97.4% | 96.9% | 96.6% | 88.8% | 82.6% |
| Content of propyl paraben | 60.0% to 110.0% | 97.0% | 98.8% | 95.7% | 95.2% | 95.8% | 91.9% | 89.4% |
| Color and Achromicity | # | Complies | Complies | Complies | Complies | Complies | Complies | Complies |
| Related Substances | | | | | | | | |
| Single max unknown impurity | NMT 0.5% | ND | 0.09% (BQL) | 0.12% | 0.10% | BQL | 0.14% | 0.19% |
| Total impurities | NMT 1.0 % | 0% | 0% | 0.12% | 0.10% | 0% | 0.14% | 0.19% |

-Intensity of the color of the sample preparation should not more intense than the matching fluid;
NMT: Not More Than;
BQL: Below Quantification Limit;
ND: Not Detected;
I: Inverted Observation: From the above data, it is observed that all physicochemical data are well within specification limit in 25° C./60% RH and 40° C./NMT 25% RH at 6 months.

Conclusion: From the above observation, it is concluded that final drug product with raspberry flavour and pH 7.0 is stable.

TABLE 9c

Results of stability study of clonidine hydrochloride oral solution, 50 mcg/mL (Trial No. 9B)

| | Pack Details | | HDPE bottle packed in secondary white box | | | | | |
| --- | --- | --- | --- | --- | --- | --- | --- | --- |
| | | | 25° C. ± 2° C./60 ± 5% RH | | | 40° C. ± 2° C./NMT 25% RH | | |
| Test parameters | Storage condition | Initial | 1 Month (I) | 3 Months (1) | 6 Months (1) | 1 Month (1) | 3 Months (I) | 6 Months (I) |
| Description | | | Clear colorless solution | | | | | |
| pH | 6.5 to 7.5 | 6.93 | 6.93 | 6.90 | 6.84 | 6.93 | 6.85 | 6.80 |
| Assay | 90.0% to 110.0% | 103.7% | 103.7% | 100.7% | 100.5% | 103.7% | 100.2% | 99.6% |
| Content of methyl paraben | 60.0% to 110.0% | 100.5% | 99.5% | 95.1% | 95.4% | 97.5% | 88.6% | 82.2% |
| Content of propyl paraben | 60.0% to 110.0% | 99.2% | 98.8% | 95.1% | 94.9% | 97.7% | 92.3% | 89.6% |
| Color and Achromicity | # | Complies | Complies | Complies | Complies | Complies | Complies | Complies |
| Related Substances | | | | | | | | |
| Single max unknown impurity | NMT 0.5% | ND | 0.05% (BQL) | 0.14% | 0.13% | 0.05% (BQL) | 0.22% | 0.24% |
| Total impurities | NMT 1.0 % | 0% | 0% | 0.14% | 0.13% | 0% | 0.22% | 0.24% |

-Intensity of the color of the sample preparation should not more intense than the matching fluid;
NMT: Not More Than;
BQL: Below Quantification Limit;
ND: Not Detected;
I: Inverted Observation: From the above data, it is observed that all physiochemical data are well within specification limit in 25° C./60% RH and 40° C./NMT 25% RH at 6 months.

Conclusion: From the above observation, it is concluded that final drug product with raspberry flavour and pH 7.0 is stable.

Example 10: Comparative Study of Trial No. 8C and Solution Compositions Disclosed in Patel

TABLE 10

Comparison of trial No. 8C with solution compositions disclosed in examples of Patel

| Sr. No. | Ingredients | Function | Trial No. 8C | Patel Ex. 1 |
|---|---|---|---|---|
| | | | Quantity (mg/mL) | |
| 1. | Clonidine hydrochloride | API | 0.05 | 0.01 |
| 2. | Sucralose | Sweetener | 1 | 0.4 |
| 3. | Methyl paraben | Preservative | 2.85 | 1.8 |
| 4. | Propyl paraben | Preservative | 0.27 | — |
| 5. | Raspberry flavour | Flavour | 0.1 | — |
| 6. | Propylene glycol | Solvent | 100 | — |
| 7. | Sodium dihydrogen phosphate | Buffering agent | 3.98 | 2 |
| 8. | Disodium hydrogen phosphate | Buffering agent | 4.28 | 0.1 |
| 9. | Purified water Water (% w/w) | Vehicle | q. s. to 1 mL ≈88-90 | q. s. to 1 mL >≈99 |

| | Impurity Profiles | | | |
|---|---|---|---|---|
| Parameters | Initial | 60° C.-7 days | Initial | 60° C.-7 days |
| Description | Clear colourless solution | | Clear colourless solution | |
| pH | 6.89 | 6.88 | 5.99 | 5.62 |
| Assay | 103.4% | 103.3% | 97.9% | 97.2% |
| RRT 2.27 | ND | ND | 0.1 | 0.11 |
| Single max unknown impurity | ND | ND | 0.1% | 0.14% |
| Total impurities | 0% | 0% | 0.1% | 0.25% |

Patel's Example 1 solution product has a higher total impurity level as compared to trial No. 8C at initial and 60° C. for 7 days. Hence, it is concluded that the formulation of trial No. 8C exhibits improved stability compared to Patel's Example 1 solution product. Further, the pH fluctuation is observed in Patel's Example 1 solution product, as compared to trial No. 8C. In other words, the formulation of trial No. 8C is more controlled formulation as compared to Patel's ex. 1. In addition to that, the formulation of trial No. 8C contains raspberry flavour, which enhance patient compliance and improve palatability by masking unpleasant tastes and making the medication more appealing. This demonstrates the importance of propylene glycol, as the related substances (single maximum unknown impurity and total impurities) are effectively controlled by the propylene glycol presence in the formulation.

Practical Utility

A surprising feature of RTU oral liquid formulations disclosed herein, include minimal impurities after storage for up to 2-years at 25±2° C. and 60±5% relative humidity. This feature is surprising considered that the formulation pH is above 6 (e.g., pH of about 6.5 to about 7.5) in view of the known assay and preservative degradation associated with clonidine. This feature is also surprising because the long-term storage stability observed herein occurs in the absence of a stabilizer (e.g., sodium chloride, histidine, meglumine, arginine, tromethamine).

Additional surprising aspects reveal that RTU formulations disclosed herein exhibit antimicrobial activity after storage for up to 2-years at 25±2° C. and 60±5% relative humidity.

Cited Information

All cited information is hereby incorporated by reference in its entirety. To the extent that the incorporated information conflicts with the meaning of information disclosed herein, the information disclosed herein shall control.

CATAPRES® (clonidine hydrochloride) tablets, for oral use, prescribing information as of May 31, 2012 ("CATAPRES® PI").

ONYDA XR® (clonidine hydrochloride) suspension, extended release, for oral use, marketed in US by Tris Pharma Inc, prescribing information as of Dec. 6, 2024 ("Tris Pharma").

Clonidine hydrochloride (50 mcg/5 mL) oral solution, summary of UK product characteristics, marketed in the UK by Syri Limited ("Syri").

Clonidine hydrochloride (50 mcg/5 mL) oral solution, summary of UK product characteristics, marketed in the UK by Roma Pharmaceuticals Ltd. ("Roma").

Clonidine hydrochloride (50 mcg/5 mL) oral solution, summary of UK product characteristics, marketed in the UK by Milpharm Limited ("Milpharm").

U.S. Pat. No. 11,207,297 B2, Liquid pharmaceutical composition of clonidine, issued on Dec. 28, 2021 to Patel et al. of Syri Ltd. ("Patel").

U.S. Pat. No. 12,233,049 B2, Stable pharmaceutical compositions of clonidine, issued on Feb. 25, 2025 to Mandge et al. of Slayback Pharma LLC ("Mandge").

U.S. Patent Application Publication No. US 2025/0064731 A1, A liquid pharmaceutical formulation of clonidine hydrochloride, published on Feb. 27, 2025 to Vishal Kumar Barot of Novumgen Limited ("Barot").

European Patent Application Publication No. EP4122450 A1, Liquid pharmaceutical composition of clonidine, Published on Jan. 25, 2023 to Carr et al., of Rosemont Pharmaceuticals Ltd. ("Carr").

Merino-Bohorquez et al. Physicochemical and microbiological stability of two new oral liquid formulations of clonidine hydrochloride for pediatric patients. Pharmaceutical Development and Technology (2018) 24 (4), 465-478.

Levinson M L, and Johnson C E. Stability of an extemporaneously compounded clonidine hydrochloride oral liquid. Am J Hosp Pharm. (1992), 49 (1): 122-5.

Additional Aspects

Aspects disclosed herein relate generally to variations of the embodiments and examples disclosed herein. The following additional aspects may be of interest for the present disclosure.

Aspect 1. A ready-to-use (RTU) oral liquid formulation, comprising: clonidine or pharmaceutically acceptable salt thereof; propylene glycol; one or more buffering agents; one or more pharmaceutically acceptable excipients; and purified water.

Aspect 2. The RTU oral liquid formulation of aspect 1, wherein the amount of clonidine or pharmaceutically acceptable salt thereof ranges from 0.01 mg/mL to 10 mg/mL.

Aspect 3. The RTU oral liquid formulation of any one of the preceding aspects, wherein the clonidine or pharmaceutically acceptable salt thereof is present in an amount of about 0.05 mg/mL.

Aspect 4. The RTU oral liquid formulation of any one of the preceding aspects, wherein the amount of propylene glycol ranges from 50 mg/mL to 300 mg/mL.

Aspect 5. The RTU oral liquid formulation of any one of the preceding aspects, wherein the amount of propylene glycol ranges from 50 mg/mL to 200 mg/mL.

Aspect 6. The RTU oral liquid formulation of any one of the preceding aspects, wherein the propylene glycol is present in an amount of about 100 mg/mL.

Aspect 7. The RTU oral liquid formulation of any one of the preceding aspects, wherein the one or more buffering agents is selected from citrate, sulfamate, acetate, aconitate, formate, glutarate, succinate, glutamate, malate, tartrate, carbonate, tris, borate, glycinate, and phosphate.

Aspect 8. The RTU oral liquid formulation of any one of the preceding aspects, wherein the one or more buffering agent is phosphate buffer.

Aspect 9. The RTU oral liquid formulation of any one of the preceding aspects, wherein the one or more buffering agent is sodium dihydrogen phosphate, and disodium hydrogen phosphate.

Aspect 10. The RTU oral liquid formulation of any one of the preceding aspects, wherein the amount of buffering agent ranges from 1 mg/mL to 50 mg/mL.

Aspect 11. The RTU oral liquid formulation of any one of the preceding aspects, wherein the amount of buffering agent ranges from 1 mg/mL to 10 mg/mL.

Aspect 12. The RTU oral liquid formulation of any one of the preceding aspects, wherein the one or more pharmaceutically acceptable excipients comprising a sweetener, a preservative, a flavour, or a combination thereof.

Aspect 13. The RTU oral liquid formulation of any one of the preceding aspects, wherein the amount of one or more pharmaceutically acceptable excipients comprising a sweetener, a preservative, a flavour, or a combination thereof ranges from 0.01 mg/mL to 10 mg/mL.

Aspect 14. The RTU oral liquid formulation of any one of the preceding aspects, wherein the formulation has a pH of from about 6 to about 8.

Aspect 15. The RTU oral liquid formulation of any one of the preceding aspects, wherein the formulation has a pH of from about 6.5 to about 7.5.

Aspect 16. The RTU oral liquid formulation of any one of the preceding aspects, wherein the formulation is substantially free of a carrier agent or vehicle (e.g., glycerin or glycerol), stabilizer (e.g., sodium chloride, histidine, meglumine, arginine, tromethamine), preservative (e.g., potassium sorbate, sorbic acid, sodium propionate, benzoic acid), sugar alcohol (e.g., xylitol), where the expression "substantially free" refers to a situation where the RTU oral liquid formulation has no added ingredient (or the amount of ingredient is about 0%).

Aspect 17. The RTU oral liquid formulation of any one of the preceding aspects, wherein the formulation has less than 0.5% clonidine related substance individual impurities after storage at 25° C./60% RH for 9 months and 40° C./NMT 25% RH for 6 months.

Aspect 18. The RTU oral liquid formulation of any one of the preceding aspects, wherein the formulation has less than 1% clonidine related substance total impurities after storage at 25° C./60% RH for 9 months and 40° C./NMT 25% RH for 6 months.

Aspect 19. The RTU oral liquid formulation of any one of the preceding aspects, wherein the weight ratio of propylene glycol to purified water in the oral liquid formulation disclosed herein is ranges from 0.8:8 to 1:11.

Aspect 20. The RTU oral liquid formulation of any one of the preceding aspects, wherein the amount of purified water ranges from 60% w/w to 95% w/w.

Aspect 21. The RTU oral liquid formulation of any one of the preceding aspects, wherein the amount of purified water ranges from 85% w/w to 95% w/w.

Aspect 22. The RTU oral liquid formulation of any one of the preceding aspects, wherein the formulation, comprising: clonidine or pharmaceutically acceptable salt thereof in an amount of about 0.05 mg/mL; propylene glycol as a solvent in an amount of about 100 mg/mL; sodium dihydrogen phosphate in an amount of about 3.98 mg/mL, and disodium hydrogen phosphate in an amount of about 4.28 mg/mL as a buffering agent; a sweetener in an amount of from 0.01 mg/mL to 10 mg/mL; a preservative in an amount of from 0.01 mg/mL to 10 mg/mL; a flavour in an amount of from 0.01 mg/mL to 10 mg/mL; and purified water; wherein the formulation is substantially free of a carrier agent or vehicle (e.g., glycerin or glycerol), stabilizer (e.g., sodium chloride, histidine, meglumine, arginine, tromethamine), preservative (e.g., potassium sorbate, sorbic acid, sodium propionate, benzoic acid), sugar alcohol (e.g., xylitol).

Aspect 23. A method for the treatment of hypertension, which comprises administering to a patient in need thereof a therapeutically effective amount of the ready-to-use oral liquid formulation of any one of the preceding aspects.

The invention claimed is:

1. A ready-to-use (RTU) oral liquid formulation, comprising: clonidine or pharmaceutically acceptable salt thereof; propylene glycol; one or more buffering agents; one or more pharmaceutically acceptable excipients; and purified water.

2. The RTU oral liquid formulation of claim 1, wherein the amount of clonidine or pharmaceutically acceptable salt thereof ranges from 0.01 mg/mL to 10 mg/mL.

3. The RTU oral liquid formulation of claim 1, wherein the clonidine or pharmaceutically acceptable salt thereof is present in an amount of about 0.05 mg/mL.

4. The RTU oral liquid formulation of claim 1, wherein the amount of propylene glycol ranges from 50 mg/mL to 300 mg/mL.

5. The RTU oral liquid formulation of claim 1, wherein the amount of propylene glycol ranges from 50 mg/mL to 200 mg/mL.

6. The RTU oral liquid formulation of claim 1, wherein the propylene glycol is present in an amount of about 100 mg/mL.

7. The RTU oral liquid formulation of claim 1, wherein the one or more buffering agents is selected from citrate, sulfamate, acetate, aconitate, formate, glutarate, succinate, glutamate, malate, tartrate, carbonate, tris, borate, glycinate, and phosphate.

8. The RTU oral liquid formulation of claim 1, wherein the one or more buffering agent comprises a phosphate buffer.

9. The RTU oral liquid formulation of claim 1, wherein the one or more buffering agent comprises sodium dihydrogen phosphate, disodium hydrogen phosphate, or a combination thereof.

10. The RTU oral liquid formulation of claim 1, wherein the amount of buffering agent ranges from 1 mg/mL to 50 mg/mL.

11. The RTU oral liquid formulation of claim 1, wherein the amount of buffering agent ranges from 1 mg/mL to 10 mg/mL.

12. The RTU oral liquid formulation of claim 1, wherein the one or more pharmaceutically acceptable excipients comprises a sweetener, a preservative, a flavour, or a combination thereof.

13. The RTU oral liquid formulation of claim 1, wherein the amount of one or more pharmaceutically acceptable excipients comprises a sweetener, a preservative, a flavour, or a combination thereof ranges from 0.01 mg/mL to 10 mg/mL.

14. The RTU oral liquid formulation of claim 1, wherein the formulation has a pH of from about 6 to about 8.

15. The RTU oral liquid formulation of claim 1, wherein the formulation has a pH of from about 6.5 to about 7.5.

16. The RTU oral liquid formulation of claim 1, wherein the formulation is substantially free of a carrier agent or vehicle selected from glycerin; a stabilizer selected from sodium chloride, histidine, meglumine, arginine, and tromethamine; a preservative selected from potassium sorbate, sorbic acid, sodium propionate, and benzoic acid; and a sugar alcohol selected from xylitol.

17. The RTU oral liquid formulation of claim 1, wherein the formulation has less than 0.5% clonidine related substance individual impurities after storage at 25° C./60% RH for 9 months and 40° C./NMT 25% RH for 6 months.

18. The RTU oral liquid formulation of claim 1, wherein the formulation has less than 1% clonidine related substance total impurities after storage at 25° C./60% RH for 9 months and 40° C./NMT 25% RH for 6 months.

19. The RTU oral liquid formulation of claim 1, wherein the weight ratio of propylene glycol to purified water in the oral liquid formulation disclosed herein is ranges from 0.8:8 to 1:11.

20. The RTU oral liquid formulation of claim 1, wherein the amount of purified water ranges from 60% w/w to 95% w/w.

21. The RTU oral liquid formulation of claim 1, wherein the amount of purified water ranges from 85% w/w to 95% w/w.

22. The RTU oral liquid formulation of claim 1, wherein the formulation, comprising: clonidine or pharmaceutically acceptable salt thereof in an amount of about 0.05 mg/mL; propylene glycol as a solvent in an amount of about 100 mg/mL; sodium dihydrogen phosphate in an amount of about 3.98 mg/mL, and disodium hydrogen phosphate in an amount of about 4.28 mg/mL as a buffering agent; a sweetener in an amount of from 0.01 mg/mL to 10 mg/mL; a preservative in an amount of from 0.01 mg/mL to 10 mg/mL; a flavour in an amount of from 0.01 mg/mL to 10 mg/mL; and purified water.

23. A method for the treatment of hypertension, which comprises administering to a patient in need thereof a therapeutically effective amount of the ready-to-use oral liquid formulation of claim 1.

* * * * *